United States Patent
McGinnis et al.

(10) Patent No.: US 8,319,640 B2
(45) Date of Patent: Nov. 27, 2012

(54) METHOD FOR MAINTAINING A SHIPPING CONTAINER MANIFEST

(75) Inventors: John McGinnis, Carrolton, TX (US); Michael E. Rader, Colleyville, TX (US)

(73) Assignee: N7 Systems, LLC, Colleyville, TX (US)

( * ) Notice: Subject to any disclaimer, the term of this patent is extended or adjusted under 35 U.S.C. 154(b) by 620 days.

(21) Appl. No.: 12/253,053

(22) Filed: Oct. 16, 2008

(65) Prior Publication Data

US 2009/0102653 A1   Apr. 23, 2009

Related U.S. Application Data

(60) Provisional application No. 60/981,130, filed on Oct. 19, 2007.

(51) Int. Cl.
G08B 13/14 (2006.01)
G08B 13/24 (2006.01)
G06Q 10/00 (2006.01)
H04B 1/06 (2006.01)

(52) U.S. Cl. ............ 340/571; 340/551; 340/572.3; 705/28; 367/135

(58) Field of Classification Search .......... 340/571, 340/551, 572.3; 705/28; 367/135
See application file for complete search history.

(56) References Cited

U.S. PATENT DOCUMENTS

| | | | |
|---|---|---|---|
| 4,750,197 A | 6/1988 | Denekamp et al. | 379/58 |
| 4,841,283 A | 6/1989 | Bubliewicz | 340/545 |
| 4,866,963 A | 9/1989 | Leininger et al. | 70/278 |
| 6,002,343 A | 12/1999 | Auerbach et al. | 340/825.54 |
| 6,049,448 A * | 4/2000 | Lanigan et al. | 361/172 |
| 6,069,563 A | 5/2000 | Kadner et al. | 340/571 |
| 6,265,973 B1 | 7/2001 | Brammall et al. | 340/568.1 |
| 6,281,793 B1 | 8/2001 | Haimovich et al. | 340/545.1 |
| 6,400,266 B1 | 6/2002 | Brown, Jr. | 340/542 |
| 6,577,921 B1 | 6/2003 | Carson | 700/214 |
| 6,747,558 B1 * | 6/2004 | Thorne et al. | 340/551 |
| 6,765,484 B2 | 7/2004 | Eagleson et al. | 340/505 |
| 6,870,476 B2 | 3/2005 | Cockburn et al. | 340/541 |
| 7,098,784 B2 | 8/2006 | Easley et al. | 340/539.13 |
| 7,194,330 B2 | 3/2007 | Carson | 700/214 |
| 7,233,247 B1 | 6/2007 | Crossno et al. | 340/572.1 |
| 7,242,296 B2 | 7/2007 | Wang et al. | 340/545.6 |
| 2006/0103524 A1 | 5/2006 | Auerbach et al. | 340/545.6 |

(Continued)

OTHER PUBLICATIONS

ABIresearch, Electronic Container Tracking White Paper, 7 pages, copyright 2004, Oyster Bay, New York abiresearch.com.

(Continued)

Primary Examiner — George Bugg
Assistant Examiner — Jack K Wang
(74) Attorney, Agent, or Firm — Whitaker Chalk Swindle & Schwartz PLLC; Stephen S. Mosher

(57) ABSTRACT

A system, method, and apparatus for monitoring and detecting movement of components of a shipping container latch. A latch monitor may embody an electromagnetic sensing unit and a nearby magnet or light emitter for measuring and characterizing the profile of a nearby electromagnetic field. The field profile is monitored to detect a change in the profile, log the change, and report any abnormal disturbance to the electromagnetic field, indicating a breach of the integrity of a latching mechanism on a shipping container. An alert of a breach event may be sent via a communication network to an authority for response. The invention can distinguish authorized, incidental, and tampering events, and also store and upload an electronic manifest for a shipping container.

10 Claims, 13 Drawing Sheets

U.S. PATENT DOCUMENTS

| | | | |
|---|---|---|---|
| 2006/0158326 A1 | 7/2006 | Easley | 340/522 |
| 2006/0202824 A1 | 9/2006 | Carroll et al. | 340/568.1 |
| 2006/0255934 A1* | 11/2006 | Easley et al. | 340/539.13 |
| 2007/0126577 A1* | 6/2007 | Cervantes et al. | 340/547 |
| 2007/0285240 A1* | 12/2007 | Sensenig et al. | 340/572.1 |
| 2008/0129219 A1* | 6/2008 | Smith et al. | 315/291 |
| 2008/0278318 A1* | 11/2008 | Auerbach et al. | 340/539.26 |
| 2008/0297346 A1* | 12/2008 | Brackmann et al. | 340/572.1 |
| 2010/0195446 A1* | 8/2010 | Michaels et al. | 367/135 |

OTHER PUBLICATIONS

RFTrax, Wireless, Sensor Superiority, 1 page, Fairfield Industries, Sugar Land, Texas, Aug. 2008; www.rftrax.com.

RFTrax, Asset Management Platform for Boxcars, 2 pages, Fairfield Industries, Sugar Land, Texas, Aug. 2008; www.rftraxcom.

RFTrax, Monitor Ride Quality with RFTRAX New Integrated Accelerometer, 1 page, Fairfield Industries, Sugar Land, Texas, Aug. 2008; www.rftrax.com.

Application Note 22702A: Linear Hall-Effect Sensors, Joe Gilbert and Ray Dewey, 12 pages, copyright 1996, 2002, Allegro MicroSystems, Inc., Worcester, Massachusetts; www.allegromicro.com.

Data Sheet 1391-DS Rev. 2: Micro-Power 3V Linear Hall Effect Sensors with Tri-State Output and User-Selectable Sleep Mode, 15 pages, Allegro MicroSystems, Inc., Worcester, Massachusetts; www.allegromicro.com.

\* cited by examiner

METHOD FOR MAINTAINING A SHIPPING CONTAINER MANIFEST

CROSS REFERENCE TO RELATED PATENT APPLICATIONS

The present U.S. Application claims priority from earlier filed Provisional Application Ser. No. 60/981,130, filed Oct. 19, 2007, entitled "APPARATUS, SYSTEM AND METHOD FOR DETECTING ENTRY TO A SHIPPING CONTAINER," by Rodney C. Montrose, Mark A. Diener, and John R. Keller.

The present U.S. Patent Application is related to U.S. Patent Application entitled "LATCH MONITORING APPARATUS FOR A SHIPPING CONTAINER DOOR;" U.S. Patent Application entitled "APPARATUS FOR DETECTING TAMPERING OF A LATCH MECHANISM;" U.S. Patent Application entitled "METHOD AND APPARATUS FOR DETECTING MOVEMENT OF A SHIPPING CONTAINER LATCH."

BACKGROUND OF THE INVENTION

1. Field of the Invention

The present invention generally relates to devices for monitoring and detecting entry to a shipping container. The invention more particularly relates to devices and methods that sense, analyze, and interpret movement of a nearby object to detecting motion of a movable portion of the latch mechanism of a shipping container.

2. Description of the Prior Art

In the shipment of goods throughout the world, the use of standardized containers to house the goods during shipment and storage has become widespread. Standardized containers provide ease of handling and adequate security of large volumes of goods as they pass through the intermodal transport networks and systems, and international ports all over the globe. A variety of systems, methods, and devices have been developed for tracking and monitoring the containers en route and in storage, as well as managing the routing and handling of containers during loading, unloading, inspection, shipment, storage, delivery, etc. Other systems, methods, and devices are in use for ensuring security of the containers and their contents. These include various kinds of locks, sealing mechanisms, signaling devices, alarms, monitoring units, etc., designed to detect tampering with a shipping container or its door and provide an indication of a tampering event therewith.

Standardized shipping containers are rectangular boxes constructed to be joined with a standardized truck chassis, or placed or stacked on a railcar chassis or shipboard space for shipping from one place (origin) to another (destination). The containers may be manipulated and stacked in a shipping yard for storage, or handling according to routing data for dispatch to a destination. The containers are typically equipped with standardized doors at one end. Typically there are two doors, hinged along the outside vertical edge of the door opening, each door extending the full height of the door opening of the container, and each extending laterally for half the width of the container. The doors each employ a standardized latch mechanism having at least one vertical rod or pole that, when rotated through an angle by a hand lever attached to the rod, moves a latching arm fixed to each end of the rod into a latched position with a receptacle on the container at the edge of the door opening just above and below the door opening. Most such shipping containers have two such latching mechanisms on each door. Thus, four such rotating rod latching mechanisms may be spaced at approximately uniform intervals across the width of the container.

As described herein below, a number of solutions have been disclosed to provide some sort of sealing device attached to the door or to its latch that must be broken or damaged to gain access to the container. Some sealing devices provide an indication that the device was subject to tampering at some time previous to a first notice of the condition of the device. Other devices, such as a switch or other sensing mechanism placed in a bridging relationship with the door and the container, may provide a signal or alarm from the switch or sensing mechanism when the door of the container is moved away from the container opening.

U.S. Pat. No. 4,750,197 issued to Denekamp et al. discloses a security system for containers that includes door sensors having magnets embedded inside each door and Hall Effect sensors positioned on the container to sense the magnetic field of the magnets when the doors are closed. Signals from the sensors may be coupled to a monitoring unit, along with outputs of other sensors in the container that are responsive to certain conditions.

U.S. Pat. No. 4,841,283 issued to Bubliewicz discloses a two-part hinge having a rotation detector embedded in a knuckle portion of the hinge, one part a stationary portion having a spaced-apart emitter and detector, the other a rotating shield plate that rotates into or out of the space between the emitter and detector as the hinge leaves are swung about the hinge pivot.

U.S. Pat. No. 6,069,563 issued to Kadner et al. discloses an electronic seal having a conductive loop that forms part of a circuit for detecting resistance changes in the loop as an indication of tampering with the loop. The loop may be enclosed in a pin or otherwise coupled into a seal body containing detection and signaling circuitry. A detection event may be stored or transmitted, and the circuitry may operate in sleep and active modes.

U.S. Pat. No. 6,265,973 issued to Brammall et al. discloses an electronic seal configured as a conductive bolt and a cavity having electrical contacts in a locking body for receiving the bolt. The locking body attaches to a container door. The bolt secures hasps of the container door latch to the locking body, and completes a circuit within the locking body. If the bolt is severed or removed, the circuit responds by transmitting a signal to a local reader.

U.S. Pat. No. 6,281,793 issued to Haimovich et al. discloses an electronic seal body for receiving both ends of a seal wire and connecting them to a circuit that senses a change in an electronic parameter, such as a resistance change as described in U.S. Pat. No. 6,002,343, that is unreadable except upon disengagement of the seal wire from the seal body. The seal body is attached to the object being protected. The seal wire may be passed through a movable part of the object being protected.

U.S. Pat. No. 6,400,266 issued to Brown, Jr. discloses a trailer having a door, a locking mechanism for securing the door, and a sensor for sensing a closed and secured door. The sensor, mounted on a stationary part of the trailer, may be a proximity, mechanical, Hall Effect, photo eye, or laser sensor. The sensor may detect the presence or the absence of a ferrous or opaque object in the locking mechanism. Sensor output signals may be used for various control functions.

U.S. Pat. No. 6,747,558 issued to Thorne et al. discloses a seal tag for a container including a locking device, which includes a bolt that passes through holes in the arms of a U-shaped member. The bolt also passes through the center of first and second coils disposed around the holes in the ends of the arms and the closed ends of a hasp assembly attached to the container and positioned between the arms. Tampering with the bolt affects the magnetic field respectively established and monitored by the coils, enabling detection of the tampering. The detection signal may be transmitted or accessed externally.

U.S. Pat. No. 6,870,478 issued to Cockburn et al. discloses a monitoring unit for attachment to a secured item such as a container locking rod. A switch in a mounting bracket of the monitoring unit arms its alarm circuit when attached and causes an alarm if the mounting bracket is removed.

U.S. Pat. No. 7,242,296 issued to Wang et al. discloses a door closure monitor installed on the inside of one door of a container and a door displacement transducer mounted in juxtaposition on the opposite door of the container. The displacement transducer may be a proximity switch, a pressure transducer, or a position switch. The transducer enters one state or the opposite state depending on the spatial relationship of the transducer and the closure monitor. An electronic circuit communicates the state of the monitor via an antenna.

U.S. Patent Application Publication No. 2006/0103524 filed by Auerbach et al. discloses an electronic seal for a shipping container lock similar to the seal of the Kadner patent (U.S. Pat. No. 6,069,563). An electronic seal wire enclosed in a frangible hollow shaft is configured for press-fit engagement with a socket. Breaking the shaft or removing the pin from the socket breaks the seal. One reusable embodiment includes a reed switch in the shaft operated by a magnet in the socket portion.

U.S. Patent Application Publication No. 2007/0285240 filed by Carroll et al. discloses a high-resistance cable coupled to a microprocessor that detects resistance changes as an electronic seal and stores the time of the change in memory. An active RFID transceiver communicates the status on demand of a remote reader.

U.S. Patent Application Publication No. 2007/0285240 filed by Sensenig et al. discloses preferred use of passive RFID devices on shipping containers for monitoring by active devices on the vehicle carrying the container or other locations close to the container's position. The active devices include GPS and processing apparatus for monitoring and tracking ID and location data.

A common characteristic of the foregoing devices and methods is that they employ a digital or binary approach by determining which of two states exists. For example, whether a door is open or closed, or a seal is broken or intact. Thus, in such systems, tampering is detected as an either/or event, without the ability to reject false indications that may appear to be tampering but actually are not tampering. A further difficulty with the either/or approach is that a "positive" indication by the prior art devices is no more informative or reliable than a likelihood of tampering. Similarly, in some of the devices, an attempted tampering event may not be detected or may be in process but goes undetected until a gross change has occurred in the sensing apparatus being monitored. Other devices and methods store the detection information for retrieval some time after the detection event actually occurred. Such indications are weaknesses in the security of shipping containers and their contents, particularly in an environment where loss prevention and terrorism interdiction are important objectives.

What is needed is an intelligent system, method, and apparatus that can detect, analyze, and distinguish a variety of potential container breach events, and make the detection information available in real time, so that accurate and timely information about attempted or realized breach of a container can be developed and made available to shipping authorities.

SUMMARY OF THE INVENTION

Accordingly, a novel system, method, and apparatus for monitoring and detecting movement of a shipping container latch are disclosed. Generally, the novel system comprises (A) a magnet attached to the shipping container latch; (B) a sensing unit disposed proximate the magnet for detecting, processing, and analyzing signals from a uniform, predetermined array of a plurality of magnetic sensors for generating a data message containing information describing a magnetic field profile produced by the magnet in the vicinity of the sensing unit; and (C) a communication network covering a predetermined area within a geographic shipping infrastructure for receiving signals transmitted by the sensing unit and outputting the data message to a control authority for the geographic shipping infrastructure.

Further, a novel method comprises the steps of (1) attaching a magnet to a movable portion of the shipping container latch mechanism; (2) installing a sensing unit proximate to the magnet for detecting changes in the magnetic field profile caused by movement of the latch mechanism; (3) generating a data message containing information about the changes in the magnetic field profile; and (4) transmitting the data message via a communication network to a control authority.

In one embodiment, a novel apparatus comprises a latch monitor for a container door including a magnet disposed on a moving portion of a latch mechanism attached to the container door and an array of magnetic sensors disposed in fixed positions relative to a stationary portion of the latch mechanism and proximate a path traversed by the magnet when it is caused to move. In another aspect, the apparatus includes a memory for storing data provided by the magnetic sensors corresponding to relative positions of the magnet with respect to the array of magnetic sensors, and a processor operative according to an executable program for analyzing the data to distinguish tampering events from a secured indication of the latch mechanism.

In another embodiment, an apparatus for detecting tampering with a latch mechanism of a door of a shipping container, the latch mechanism having a stationary component and a movable component, comprises an emitter of electromagnetic flux disposed on a first component of the latch mechanism; at least first and second sensors, responsive to the flux, disposed on a second component of the latch mechanism; a defined set of detection zones proximate the first and second components of the latch mechanism; and a processor configured to receive and analyze output signals from the at least first and second sensors to distinguish tampering attempts from authorized or incidental movements among the components of the latch mechanism.

In yet another embodiment a lock detector for a shipping container latch member having a longitudinal axis and configured to rotate about or slide along the longitudinal axis, comprises an emitter of electromagnetic flux having an axis of emission integral with said latch member and disposed substantially along a radius of said latch member; a detector of the electromagnetic flux comprising at least first and second detection elements fixedly disposed proximate said emitter and on a line perpendicular to an axis of emission of the flux, wherein the line lies in the plane of motion of the emitter whether it rotates about or slides along said longitudinal axis; wherein the first and second elements are disposed substantially equidistant on either side of the axis of emission when the container latch member is in a closed and latched condition.

In yet another embodiment, a method for detecting movement of a shipping container latch, comprises the steps of attaching a magnet to a movable portion of the shipping container latch; installing a sensing unit on a stationary portion of the container latch and proximate to a path traversed by the magnet for detecting changes in a magnetic field profile caused by movement of the movable portion of the container latch; and processing data representing the changes in the magnetic field profile to determine whether movement of the container latch is authorized or incidental or a tampering incident. In another aspect, the method includes the steps of generating a data message containing information derived in the processing step; and transmitting the data message via a communication network to an external control terminal.

In yet another embodiment, a sensing apparatus for detecting movement of a shipping container latch, comprises a magnet disposed within the body of a movable portion of the shipping container latch; a housing; a plurality of magnetic field sensors disposed in a uniform, predetermined configuration and supported by said housing proximate said magnet, each said sensor providing an output signal proportional to a magnetic field intensity produced by said magnet at the location of each said sensor; a processor including a memory operating under the control of an executable program residing in said memory for receiving and analyzing the output signal from each sensor to obtain a magnetic field profile produced by the magnet; and a transmitter for sending a data message generated by said processor, said data message containing information describing the magnetic field profile and whether it compares identically with a signature profile stored in the memory.

In yet another embodiment, a method for maintaining a manifest for a shipping container, comprises the steps of reducing the manifest to digital form and storing it in a memory in a central processor; establishing a communication link from the central processor to a latch monitor installed on the shipping container; transmitting the manifest to the latch monitor for storage in a non-volatile memory segment therein; and providing for retrieval of the manifest from a terminal external to the latch monitor upon a command transmitted from the terminal to the latch monitor.

In yet another embodiment, a method for maximizing battery life in a latch monitor for a shipping container latch mechanism, comprises the steps of connecting the output of a battery to a switchmode regulator loaded by a supercapacitor; coupling each loading circuit in the latch monitor requiring current to the output of the supercapacitor through a low-loss switch; and controlling the low-loss switch of each circuit according to the need for operating current by the circuit.

DETAILED DESCRIPTION OF THE INVENTION

Figure 1:
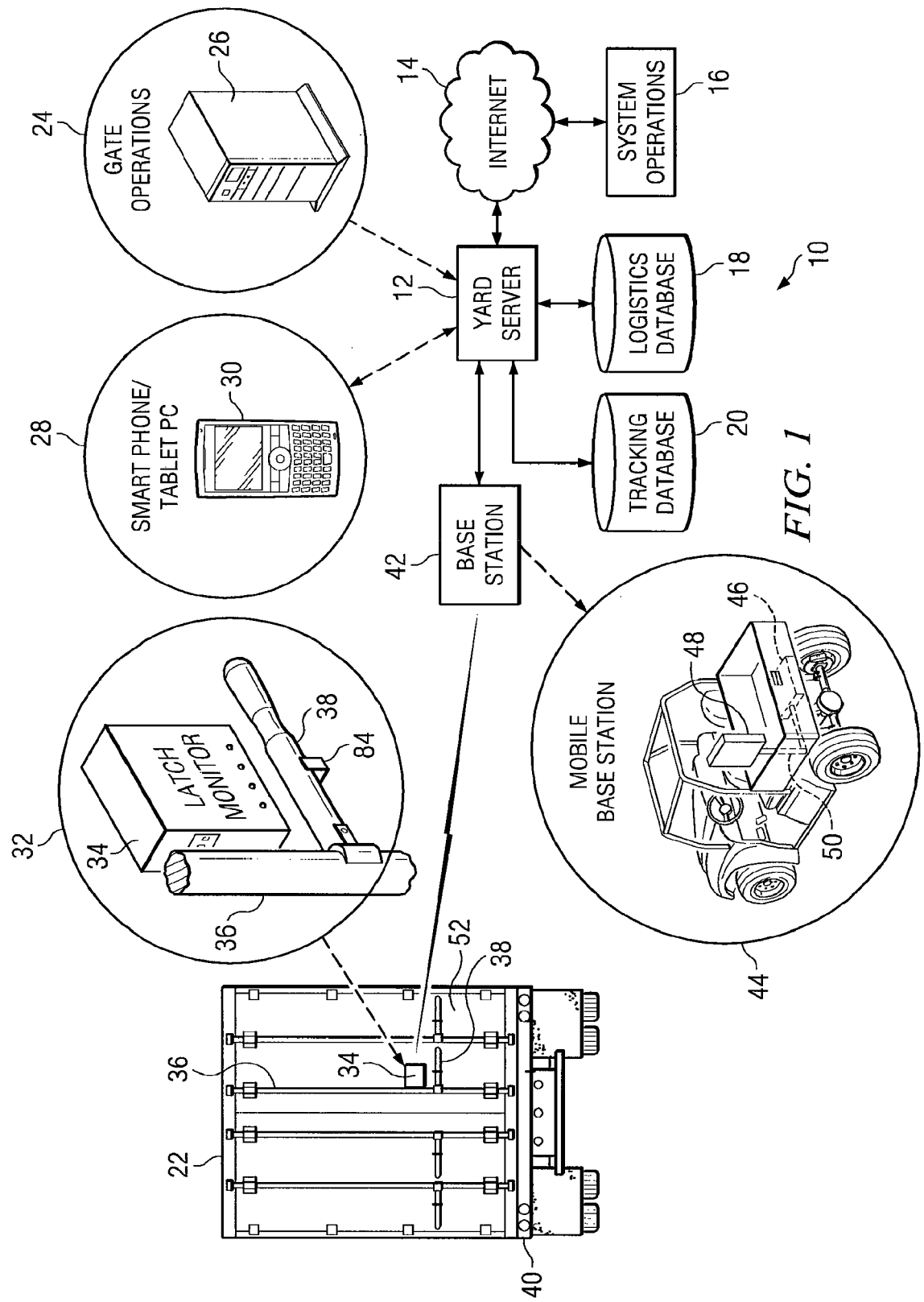
FIG. 1 illustrates one embodiment of the system of the present invention.

The following description of at least one embodiment of the present invention is provided to illustrate and demonstrate the principles of the invention. Therefore, this description is not intended to be limited to the particular embodiment disclosed herein. Persons skilled in the art will understand and appreciate various alternatives to many of the details set forth in this description, yet the embodiments realized thereby nevertheless will fall within and make use of the principles of the present invention as recited in the appended claims. As discussed herein above, the present invention addresses the problems of conventional monitoring and tracking systems and methods for shipping containers, whether they are stand alone containers or the box-like cargo enclosures of trucks or other vehicles. These problems include the inability to distinguish movement in mechanisms used for latching and locking shipping containers that is unauthorized—i.e., tampering—from movement that is authorized or expected or incidental. The solution to these problems is provided in the novel invention described as follows.

The invention includes a system, method, and apparatus for detecting the opening of or tampering with the door of a shipping container, truck or van that utilizes a typical door closure and latching mechanism. The typical latching mechanism includes one or more rotating members (a.k.a. rods or bars or poles, and may be termed herein rotating rod or bar, latch rod, locking bar, etc.) attached to the outside of the doors of the container. A lever attached to the rotating member enables one to latch and lock the door. The door may be unlatched by lifting and rotating the lever through an angle away from the door. The present invention employs analog sensing technology to measure and detect the degree of rotation or extent of longitudinal movement of the rotating member when the lever is moved or the rotating member is otherwise caused to rotate or shift in position. The analog approach provides much more information that can be analyzed and interpreted to distinguish beyond a simple either/or condition that is often amenable to false indications. The invention is also capable of detecting other kinds of events that are evidence of tampering attempts, or of incidental circumstances that, while not tampering attempts per se, may affect the operation or integrity of the apparatus of the present invention. For example, the use of a magnetic field external to the structures of the invention, which may indicate an attempt to disable or trick the apparatus into allowing a container door to be opened by an unauthorized agent, is detectable and may be logged in the apparatus. In another example, natural or incidental events such as electromagnetic disturbances from weather events or man-made circumstances may also be detected and logged, or ignored.

In one embodiment, the detection system includes a latch monitor to be described that employs a magnetic field disturbance detector. A small but powerful magnet, such as a bar magnet having a north and a south pole, is attached to or embedded in the rotating member of the latch mechanism. The magnet establishes a magnetic field in the vicinity of the magnet. In a tamper-proof box or housing installed next to the rotating member is located an array of very small, analog magnetic field sensors that provide a sensitive way to measure and characterize the profile of the magnetic field, in both its extent and intensity, in any possible condition of the container latch mechanism whether it is stationary or non-stationary. The box or housing, which houses a control unit and transceiver, contains a processor, receiver-transmitter, and antenna in addition to the magnetic sensor array. The processor receives and processes output signals from the sensors. The receiver-transmitter and antenna enables communication between the latch monitor and external entities such as a base station, server, or nodes of a mesh network grid established in a container yard, for example.

When the container door is latched, the processor in the latch monitor evaluates the characteristics of the sensed magnetic field and stores it as a signature or "fingerprint." Any attempt to use the latch mechanism, or any movement of the rotating portion of it, causes movement of the magnet, which disturbs the field. The altered field characteristic is compared to the "fingerprint" by the processor. The mismatch is detected, stored or logged, and interpreted within a user-selectable amount of variance to reduce false alarms or alerts. The processor in the latch monitor described herein further contains software to interpret the disturbance of the magnetic field produced by the magnet in the rotating or moving portion of the latch mechanism to distinguish a bonafide container breech from accidental or incidental disturbances. Such disturbance events may include vibration caused during handling, transit, or movement of the container in authorized actions. When necessary, according to a pre-established protocol, an alert signal may be output to a communication network and a message transmitted to an authority for response when the variance is exceeded.

While the foregoing example is implemented based on a magnet and a magnetic sensing system, the invention contemplates other types of electromagnetic field emission devices including electromagnets, light emitters, etc., and appropriate corresponding sensing systems. Accordingly, as will be described in detail herein, the present invention provides new and heretofore unavailable functional capabilities in tracking and monitoring devices for shipping containers, providing far beyond the limited functions of conventional passive or active RFID "Tags," for example. The present invention includes advanced sensing apparatus for detecting movement of latch mechanism components, and processing and communication apparatus for interpreting the conditions detected by the sensing apparatus, logging the events, and communicating the events as necessary to external authorities. The present invention further includes the ability to store and process requests for an electronic manifest to accompany the shipping container that is available for review as necessary by shipping facilities and customs or security personnel.

Referring to FIG. 1, there is illustrated one embodiment of the system of the present invention. A shipping container yard system 10 ("system") that is typical of an intermodal shipping facility is shown that includes a yard server 12 and a connection to a global communication network such as the Internet 14, to which may also be connected a system operations facility 16. The foregoing components of the yard system 10 may further be part of a larger scale logistics and shipment tracking and management system. It will be apparent that standardization of equipment and protocols is essential to the operating efficiency and security of such interconnected systems. A logistics database 18 and a tracking database 20 may also be connected to the yard server 12. The yard server 12 may further be in communication with additional units such as a gate operations terminal 24, a smart phone or tablet PC ("handheld terminal") 28, or a base station 42. The handheld terminal 30 may be a personal digital assistant or PDA (as shown), or alternatively a smart phone or a phone configured for wireless application protocol (WAP). The gate operations terminal 24 may include a PC 26 in communication with the yard server 12. The base station 42 may be configured as a small vehicle to provide a mobile base station 44 that includes a communication terminal 46 coupled to an antenna 48 via a transmission line 50.

The mobile base station 44 may be in communication with a shipping container 22, which may or may not be supported on a chassis 40 of a truck. In the present example of the invention, the mobile base station is shown in communication with a latch monitor 34 of a latch assembly or mechanism 32, which includes the latch monitor 34 attached to a door 52 of the shipping container 22, and a rotating latching rod 36 operated by a handle 38 attached thereto. The container door 52, rotating rod 36, and handle 38 illustrated and described is typical of a standard configuration. Generally, two doors are used on each container. Both doors are equipped with the same latch mechanism 32 as described above. As will also be apparent, the latch monitor 34 of the present invention may be installed on either door 52 of the container 22, and at any location along the rotating rod 36 except where the handle 38 is attached. As will be further described for FIG. 4 herein below, the latch monitor 34 includes a magnet installed in or on the latching rod 36 adjacent the position of the latch monitor 34. In some container latch assemblies the latching rod or bar may be configured to slide linearly along its longitudinal axis rather than or in addition to rotating about the longitudinal axis.

Figure 2:
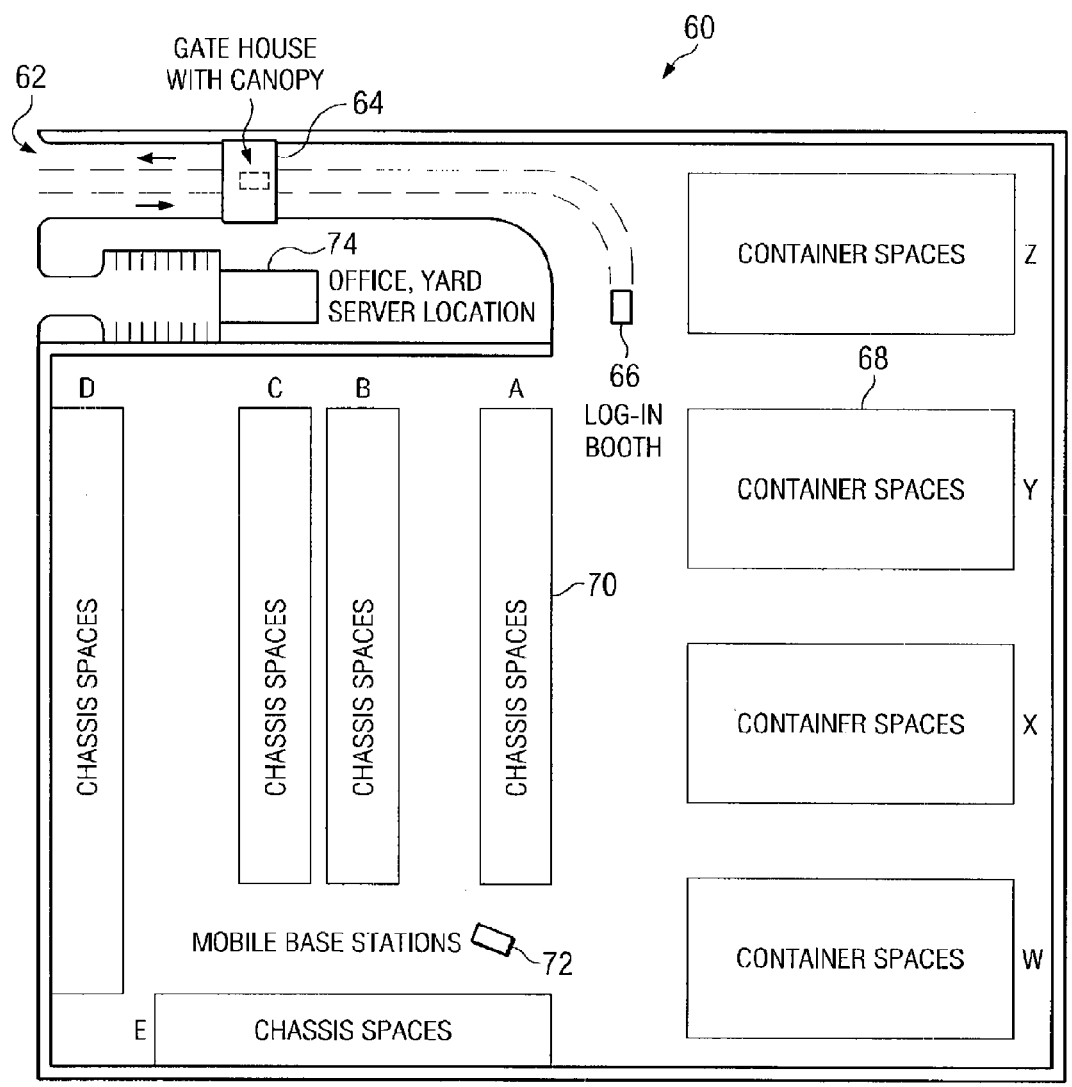
FIG. 2 illustrates one embodiment of a container yard facility that may be used by the system of the present invention illustrated in FIG. 1.

Referring to FIG. 2 there is illustrated one embodiment of a container yard facility 60 ("yard 60") that may be used by the system 10 of the present invention illustrated in FIG. 1. The yard, which may be situated on available land, includes an entrance 62, a gate house 64, and a log-in booth 66. The gate house 64 may include a canopy or be an enclosed space.

Similarly, the log-in booth 66 may be a fully enclosed office. The yard 60 may include container spaces 68 designated for the storage of containers 22 and chassis spaces 70 designated for the storage (i.e., parking) of truck chassis 40 as shown in FIG. 1. The container spaces 68 typically accommodate the stacking of containers to maximize the utilization of the available space. The container spaces 68 may be designated by lot identification symbols such as the letters W, X, Y, and Z as shown in FIG. 2. The chassis spaces 70 enable storage or parking of chassis 40, with or without a container 22 attached thereto. The chassis spaces 70 may also be designated by lot identification symbols such as the letters A, B, C, D, and E as also shown in FIG. 2. In some yards 60, the spaces 68, 70 and/or the individual spaces within the lots may have coordinates of latitude and longitude associated with each space, to enable accurate location information for each container 22 stored therein. One or more mobile base stations 72 may be used, to roam the yard while communicating with the latch monitor systems 32 and the yard server 12, which is typically located in a yard office 74. In some embodiments, the base station(s) 72 may be located in the yard office 74. The yard 60 is merely one example to illustrate exemplary basic content of a container yard for use with the present invention. Many variations are possible to adapt to local circumstances.

Figure 3:
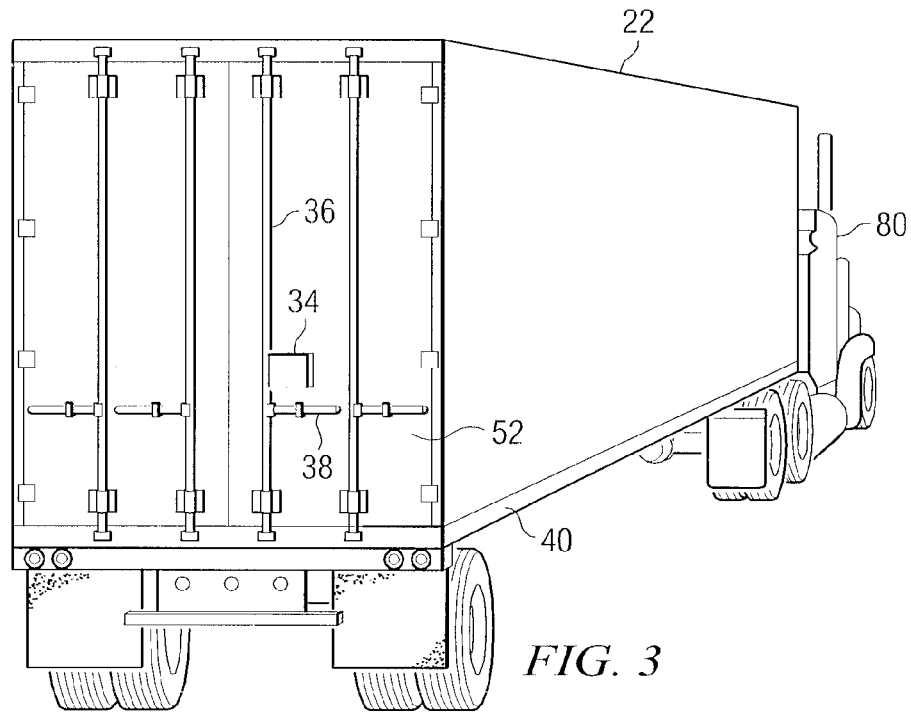
FIG. 3 illustrates a container transport and chassis loaded with a shipping container that includes apparatus of the embodiment of the present invention illustrated in FIG. 1.

Referring to FIG. 3 there is illustrated a container transport vehicle 80 (a.k.a. "Truck 80") and chassis 40 loaded with a shipping container 22 that includes the apparatus of the described embodiment of the present invention illustrated in FIG. 1. The same reference members are used as in FIG. 1, which refer to the same structures. For example, the container 22 includes left and right container doors 52 secured in a closed position by a set of vertically disposed rotating rods 36, usually two such rods 36 for each door 52. The rotating rods 36, which function as locking bars, operate to release locking cams (not shown in the figure because they are well known standard features of the locking bars) at the top and bottom of the locking bar 36 when it is rotated by a lever or handle 38.

Figure 4:
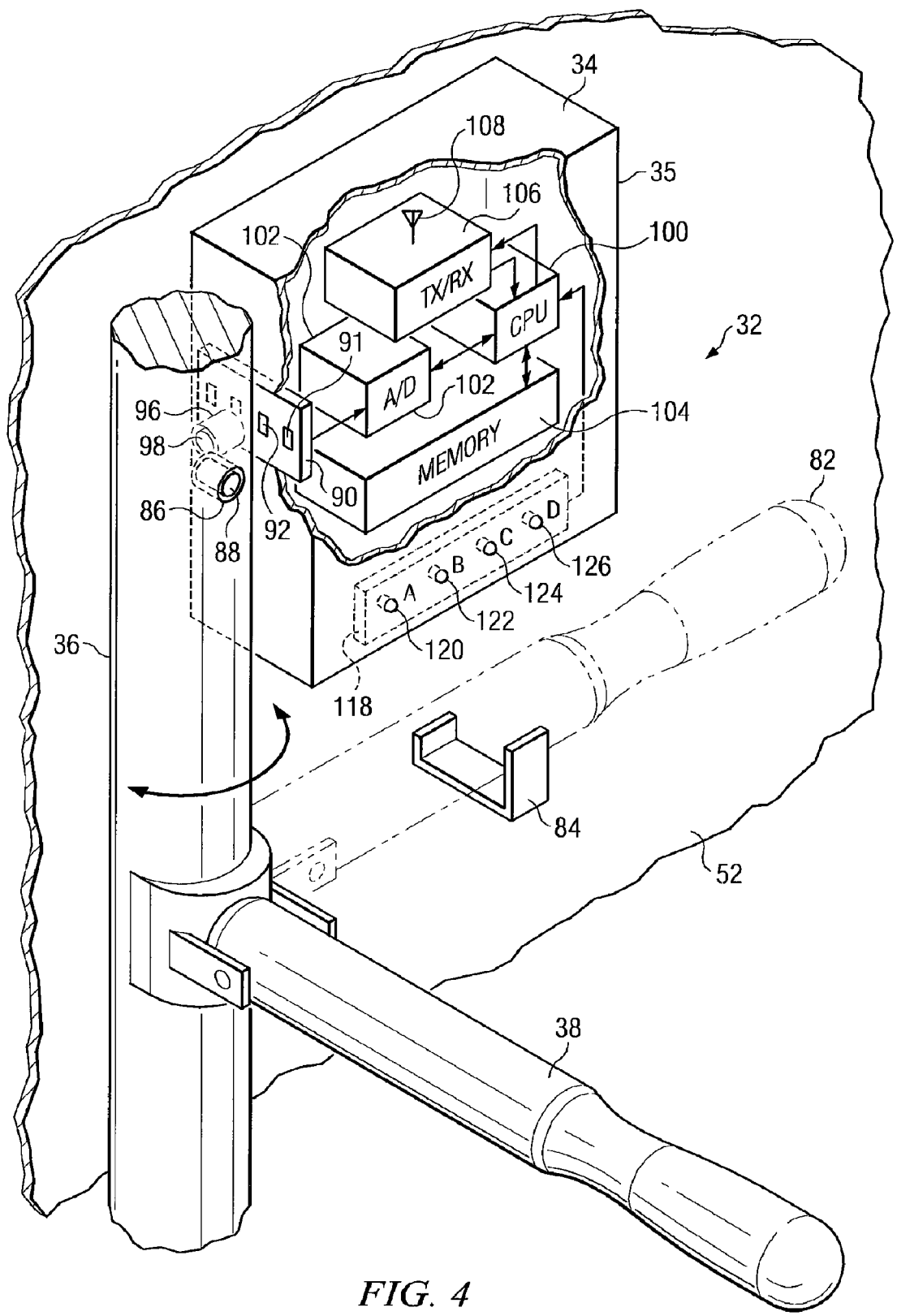
FIG. 4 illustrates a portion of a container door of the shipping container shown in FIG. 3 that includes one embodiment of a latch monitoring device according to the present invention.

FIG. 4 illustrates a portion of a container door 52 and the door latch assembly or mechanism 32 of the shipping container 22 shown in FIG. 3. The door latch mechanism 32 includes the rotating latching rod 36, its handle 38, 82, the bracket 84, and the magnetic disturbance sensor 88, 90 and its associated components to be described. The drawing of FIG. 4 includes one embodiment of a latch monitor 34 according to the present invention. The latch monitor 34, which may be enclosed in a housing 35, is shown positioned to the right of and near the rotating latching rod 36, as would likely be the case for mounting on the right hand container door 52. A mirror image drawing of FIG. 4 would show the orientation of the latch monitor 34 and rotating rod 36 for a mounting installation on the left container door. Several essential features of the latch monitor 34 are shown including a first angular position of the handle 38 of the rotating rod 36 extending outward from the surface of the door 52 and parallel with the axis of the bar magnet 88. This angular position of the handle 38 corresponds to an unlatched condition of the door latch mechanism 32. A second angular position of the handle 82 is shown in phantom (and again, parallel with the axis of the bar magnet 98) in place within a bracket 84, corresponding to a latched condition of the latch assembly or mechanism 32. In the description that follows, the magnet will be designated as magnet 88 unless otherwise stated. The magnet 88 is shown in this example as a small cylindrical bar magnet oriented along a radius line of the rotating rod 36. The bar magnet 88 may be generally oriented perpendicular to a longitudinal centerline of the rotating rod 36. It will often be the case, for example, that the magnet 88 will be oriented approximately parallel with the handle 38 of the rotating rod 36.

One of the novel features of the present invention is the ability of the latch monitor 34 to distinguish between tampering with the latch mechanism 32 and authorized or incidental movement of the components of the mechanism relative to each other. Selection of the magnet 88 for the latch monitor of the present invention is an important factor in the design. The magnetic flux required of the magnet 88 falls within a relatively narrow range, depending on the proximity of the sensors 91-94 to the magnet 88, the sensitivities of the sensors, the resolution of the measurements required to detect and differentiate the variations in displacement of the components of the latch assembly 32, etc. As will be described, if the flux is excessive in the vicinity of the measurement, the detection zones—defined adjacent areas through which the magnet 88 moves relative to the sensors in the sensor array 90 (which may also be called an array of sensors 90 herein)—cannot be clearly resolved. Conversely, if the flux is weak in the vicinity of the measurement, reliable detection cannot be assured. Either condition results in ambiguous measurements that are not adequate for distinguishing tampering from authorized or incidental movement of the latch mechanism 32. Reference to the sensitivity specifications of the sensors, and to the geometry and dimensions of the magnet and sensor relationships as the latch mechanism 32 is operated through its range of motion, provide the conditions necessary to determine the required sensitivity. The geometry and spatial relationships of the sensor array 90 and the magnet 88 will be described further in conjunction with FIG. 6.

Continuing with FIG. 4, a suitable magnet for the magnet 88, available as a standard item from CMS Magnetics, Richardson, Tex., is a bar magnet made of Neodymium, Iron, and Boron (NdFeB), having dimensions (in this example) of 0.125 in. dia.×0.500 in. length, a flux density (or energy product) of 42 MegaGauss-Oersteds, and a surface field strength of 4140 Gauss. The surface field strength is an important parameter because it is the flux at the end of the magnet 88 (i.e., in close proximity to the pole of the magnet) that is detected and measured by the array of sensors 90. This material NdFeB is selected because it retains its magnetism longer (high coercive force) than other materials, even in the presence of a strong demagnetizing field, and because the material provides a much stronger field per mass unit. The magnet may be nickel plated and/or embedded in the rotating rod within a non-magnetic sleeve 86, 96 of brass or aluminum to protect the magnet from corrosion or damage. The end of the magnet 88, 98 proximate the sensor array 90 will preferably be flush with the surface of the rotating rod 36. The latch monitor 34 should be mounted on the container door 52 so that the proximate pole of the magnet 98 is as close to the sensor array 90 as possible. In a practical sense, this closeness will limited by the thickness of the housing of the latch monitor 34 to approximately 0.150 inch.

The orientation of the array of sensors 90 in FIG. 4 is appropriate for mounting the latch monitor 34 adjacent to the right side of the rotating rod 36 as shown. Alternatively, the latch monitor 34 may be configured with the array of sensors 90 on the opposite side of the latch monitor 34 so that it may be mounted adjacent to the left side of the rotating rod 36. Further, some embodiments may be configured to accommodate positioning of the latch monitor 34 on either side of the rotating rod 36 merely by inverting the orientation of the latch monitor 34 next to the rotating rod 36.

The magnet 88 is attached to the rotating rod 36 (alternatively "bar 36" or "pole 36") portion of the container latch assembly 32 so that it is adjacent to the sensor array 90 when the rotating rod 36 is in a closed position 82. The closed position 82 is indicated by the phantom drawing of the handle 38 within the bracket 84. The bracket 84 may include features to facilitate locking the handle 38 into the closed position 82. The magnet 88 establishes a magnetic field in its vicinity, which, when undisturbed, exists in a quiescent form having an extent and an intensity that is measured by the sensor array 90 and processor 100. The sensor array 90 detects the direction and intensity of the field at the location of each sensor 91-94. As will be described in detail herein below, the combination of the data from each sensor location enables the processor 100 to map or create a graph of the profile of the magnetic field.

Briefly, the profile of the magnetic field in this quiescent condition—a signature or "fingerprint" comprising the combination of the signals from the array 90 of sensors—is converted to digital data and stored in a memory device within the latch monitor. If the rotating bar 36 on which (or in which, in this example) the magnet 88 is mounted is moved, the profile of the magnetic field is changed or "disturbed." The changed profile is compared with the stored "fingerprint." This comparison is performed at frequent periodic intervals, providing what is essentially a continuous monitoring of the magnetic field established by the magnet 88. If the differences in the profile are not due to normal vibration or other conditions not involving intentional movement of the latch mechanism 32, the processor (or CPU) 100, which interprets the differences according to stored algorithms, then the processor 100 may generate an alert signal that is output to the transmitter portion of the transmitter/receiver (Tx/Rx) 106 for communication via antenna 108 to a mesh communication network linking the latch monitor 34, base station 42, yard server 12, and any other latch monitors 34 (or nodes) in the vicinity, signifying that the container has been tampered with. The latch monitor 34 may alternatively be polled periodically to access a "log" stored in memory 104, for retrieval of the profile data representing the condition of the latch mechanism 32.

Continuing with FIG. 4, other elements of the latch monitor 34 as shown, such as the sensor array 90 having sensors 91-94 (only sensors 91 and 92 are shown in FIG. 4), and internal processor circuit components 100, 102, 104 of the latch monitor 34. The processor circuits include a microprocessor 11, an analog-to-digital converter 102, and a memory 104, which may further include a 4K EEPROM, a 256K FLASH memory, and an 8K SRAM. The EEPROM may typically contain stored or user-setable parameter values, threshold and time values, reference and state levels, etc. The FLASH memory may typically contain logged events files (time, location, event descriptors) and electronic manifest data. The SRAM may contain global variables for any of the tasks and keep track of the latest reading during the GPS task.

Also shown in FIG. 4 is a status monitor circuit 118 that includes an array of LED (light emitting device) lights A (120), B (122), C (124), and D (126). The status monitor 118 aid the operation of the LED lights A, B, C, and D ("LEDs") will be further described in conjunction with FIG. 5. Further, other internal components of the circuitry within the latch monitor 34 will be described further in conjunction with FIG. 5.

One suitable magnetic field sensor for each of the sensors 91, 92, 93, and 94 of the sensor array 90 is a type A139X Micropower 3 Volt Linear Hall Effect Sensor available from Allegro Microsystems, Inc. of Worcester, Mass. 15036. This device has a sensitivity of 1.25 mV/G, tri-state output, and a sleep mode to conserve battery energy. It is also, because of its very small size, well-adapted to use in an array of a plurality of like sensors. As will be described further for FIG. 6, the four sensors 91-94 are arranged in a single row, laterally disposed with respect to the vertical axis of the rotating rod 36, and positioned such that the north (or south) pole of the magnet 88 may be centered between the sensors 92 and 93 when the latch mechanism 32 is in a closed and latched condition. Movement of the magnet 88, corresponding to movement of the handle 38 as the latch mechanism 32 is opened or closed, thus swings in an arc in the same plane as the sensors 91-94. The plane of motion of the magnet, which plane includes the array of sensors 90, is divided into a series of detection zones to enable correlation of the sensor outputs with the positions of the magnet 88. See FIGS. 6 through 9 herein below.

During development of the magnet and sensor array for the latch monitor 34 of the present invention, experiments with a number of different sensor arrays, and the member of sensors in the array, were performed to determine which one provided the least ambiguous measurements of the field associated with the magnet as it moved through its arc of motion when the latch mechanism was opened and closed and latched. In addition, the conditions of movement of the components of the latch mechanism must be defined for tampering events as well as for authorized or incidental events involving the relative movement of the magnet with respect to the sensing apparatus. One would think that the array of sensors required to detect and characterize all relevant positions of the magnet in the rotating rod of the latch mechanism must include at least two sensors disposed along each of two orthogonal axes in a plane, wherein the plane containing the sensing elements is disposed parallel with the longitudinal axis of the rotating rod and perpendicular to the axis of the bar magnet when the latch mechanism is closed and latched. However, unexpectedly, it turned out that the best combination of sensing elements is an array of four elements disposed along a straight line in the plane of rotation of the magnet and spaced close to the proximate end of the magnet when the latch mechanism is closed. In this relationship the line of sensing elements is perpendicular to the magnet axis when the latch mechanism is closed. The surprising result was that this simple geometry enabled reliably distinguishable measurements of the movements of the magnet in a three dimensional rectangular coordinate system. This geometry will be further described for FIGS. 6 through 10 herein below.

Continuing with FIG. 4, a suitable selection for the processor (CPU) 100 in this example is a type ATmega2560 available from Atmel Corporation, San Jose, Calif. The ATmega 2560 is a low power 8-bit microcontroller with RISC architecture, several non-volatile memory segments, a 10-bit analog-to-digital converter (ADC), and other features that provide very low power consumption. This microcontroller thus includes the processor 100, A/D 102, and memory 104 in a single chip. A suitable candidate for the transmitter/receiver 106, which has location capability and a built in processor, is a type CC2431 Low Power RF SOC (system on chip) developed for so-called "Zigbee®" wireless network applications and available from Texas Instruments, Dallas, Tex. Persons skilled in the art will readily understand how to configure these components to perform the functions required to implement the present invention as set forth in the following description. Generally, protocols must be defined for use in a peer-to-peer or mesh network, wherein the "clients," or terminals (i.e., latch monitors and base stations, etc.) are defined as "nodes" in the network. In the network of the present invention, the clients are power-conscious units in which the radio or transceiver 106 is only powered on at periodic or certain controlled times. Useful references for configuring the mesh network include Application Note AN042, Rev. 1.0, "CC2431 Location Engine," by K. Aamodt, published by Texas Instruments, Dallas, Tex. and incorporated herein by reference in its entirety; and a data sheet for the CC2431, Rev. 2.01 (SWRS034B) "System-On-Chip for 2.4 Ghz ZigBee®/ IEEE 802.15.4 with Location Engine," also available from Texas Instruments, Dallas, Tex., and incorporated by reference herein in its entirety. The ZigBee® wireless network standard is available from the ZigBee® Alliance at www.zigbee.org.

Communication between the transceiver 106 in the latch monitor 34 and other nodes in the network—base station, gateway (server), etc.—proceeds according to a standard protocol, summarized in the following paragraphs describing FIG. 5.

Figure 5:
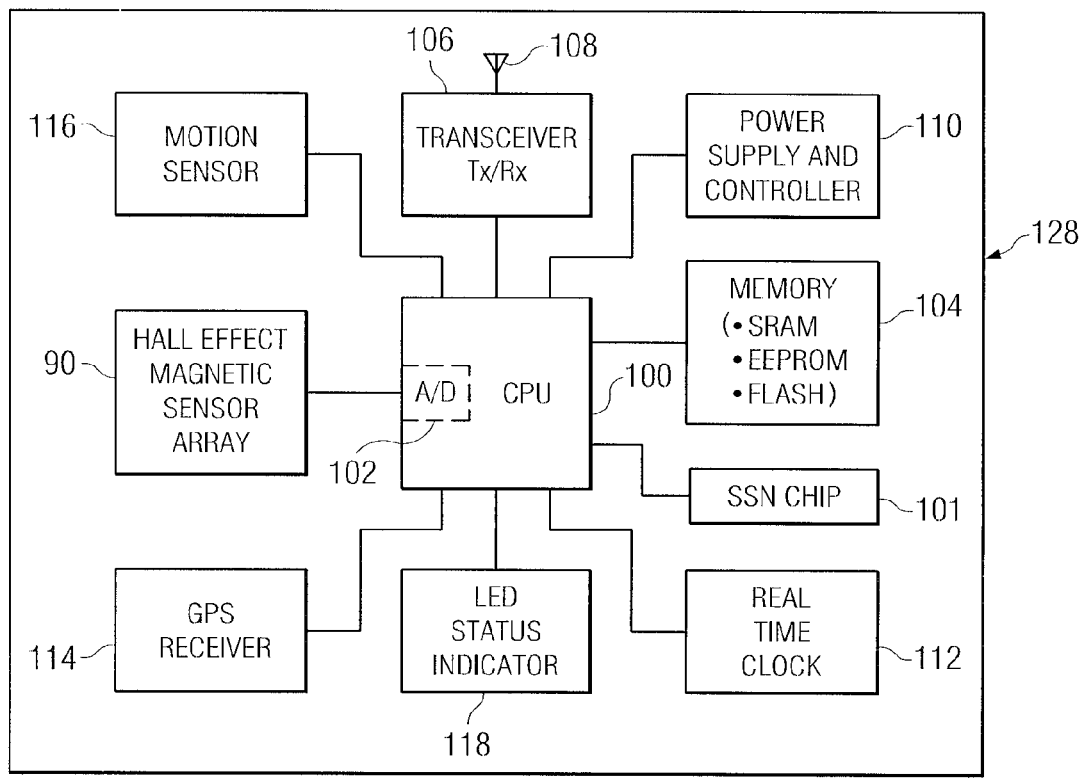
FIG. 5 illustrates a block diagram of one embodiment of electrical circuitry that may be used in the embodiment of the present invention shown in FIG. 4.

FIG. 5 illustrates a functional block diagram of one embodiment of electrical circuitry that may be used in the embodiment of the present invention shown in FIG. 4. The latch monitor circuit 128 for the latch monitor 34 includes the aforementioned Hall Effect Sensor (HES) array 90 coupled to the processor 100 at the inputs to an analog-to-digital converter (A/D) 102 section of the processor 100. The processor or CPU 100 includes in its memory 104 several segments such as EEPROM, SRAM, and Flash memory for storing instructions and algorithms, logging operating event data, and storing other data such as latch monitor data, container manifest information, etc. For example, in the illustrative embodiment, the internal Flash memory may hold program as well as the event logs to be described. Further, it is also possible to configure the system to utilize external non-volatile memory such as SD memory cards, portable hard disc drives, and the like for the storage of log events or other data.

Also connected to the CPU 100 is a silicon serial number chip (SSN) 101. The SSN chip 101 provides a unique identifier that may be accessed via a serial connection. It is provided in the latch monitor 34 to enable each latch monitor to be uniquely identified on a global basis for an extended period of time (for example, up to twenty years). A shipping container 22 bearing the latch monitor 34 moves within, among, and between various infrastructure zones, ports, and yard systems 10, countries of the world, different tracking systems, as these shipping containers move via air, land, and sea transport vehicles or are stored awaiting further operations. Although it may seem that field programmable identification numbers would be suitable for a latch monitor for shipping containers, experience suggests that the likelihood of duplicate numbers or misplaced identifiers, though small, should be avoided. Thus, it is essential that no two latch monitor devices have the same identification number. In the present embodiment, the SSN chip 101 is also selected to be independent of whatever radio technology is chosen for the communications functions of the latch monitor 34 embodied in the transceiver 106. Since the transceiver device selected for the transceiver 106 in some present or future applications may employ one of several available technologies, or perhaps employ multiple radio technologies, each possibly having a serial or identification numbering system, it is important that the latch monitor 34 have a unique, independent identifier. The SSN chip 101, as implemented in the illustrated embodiment, provides a unique 48 bit number (a Global Unique ID) stored in a one wire, serial ROM that identifies the particular latch monitor to whatever communication or tracking or management network to which it may be connected. The SSN is accessed during a POST (power on self test) routine to be described herein below. The SSN chip 101 employed in the illustrated embodiment is available as an integrated circuit from Maxim/Dallas Semiconductor, Richardson, Tex. as part no. DS2401.

One of the important features of the present invention is the provision of sufficient storage capacity to store the manifest for the container in the latch monitor 34 attached to the container 22. As is well known, a manifest is a listing of the contents of a container or transport vehicle. The information in a manifest includes details of the contents and its value, the origin, shipper and destination, etc. The manifest information, reduced to digital form and stored in the memory or database of a processor at a shipping point, for example, may then be transmitted to the latch monitor 34 for storage therein in a segment of its non-volatile memory 104. This manifest is retrievable for viewing on command by shipping or security officials or by U.S. Customs officials at any point during transit. Moreover, a complete and functioning network between local servers is not required to retrieve the manifest information. It is only required to be within range of other nodes in the communication network.

The manifest data, electronically stored in the latch monitor (downloaded) at the point of origin, may be uploaded to a base station or other authorized terminal whenever the container comes within range of the base station and viewed on a yard server display, or, alternatively, a mobile base station comes within range of the container, with viewing enabled on a yard server display. The manifest may also be viewed on handheld devices in communication with the yard server. However, as a security measure, it is not advisable to include direct upload of the electronic manifest to a handheld device except when it is being operated by Customs or security officials. The latch monitor 34 includes support for the e-Manifest of the Automated Commercial Environment (ACE) protocol, a commercial trade processing system recently developed by the U.S. Customs and Border Patrol ("CBP"). The CBP is a component of the Department of Homeland Security. Thus, it is also possible that the e-Manifest can be automatically uploaded to local CBP computers for compliance with the ACE system.

As an example of downloading an electronic manifest from the latch monitor 34, the process e.g., so-called "flash update," occurs during communication with the latch monitor 34 via its transceiver 106 according to the communications protocol embodied in the transceiver 106 and the network to which it is connected. The communication network may be implemented by any of a variety of radio or wireless configurations. In this illustrative example, a ZigBee® "mesh" system is employed. In this communication, messages are exchanged between the sender and receiver (respectively, e.g., a "tower" or yard office and a latch monitor on a shipping container) to begin a message sequence, acknowledge it, clear and acknowledge a checksum, send and check a block of data, repeating the latter step until all the blocks in the sequence are sent, checked, and acknowledged. This process is well known to persons skilled in the art and need not be explained in detail herein. The process for uploading data from the latch monitor on command to a base station or yard office or other terminal is similar but in the reverse direction. These communications processes are made possible by the fact that the latch monitor is an intelligent, active device, by virtue of the processing, storage, and communicating capabilities built in to it, along with the latch monitoring capabilities included within the latch monitor 34.

The CPU 100 is the central processor in the latch monitor 34, running software that controls all functions of the device including wireless communication, sensor monitoring including processing (A/D 102) of the analog signals from the Hall Effect Sensors, location detection, power management, memory management, time keeping, and status display, as will be described. Criteria for selecting the CPU include low power consumption and judicious use of power saving modes, on-chip non-volatile memory segments, A/D conversion, real time clock, etc. A suitable choice is the 8-bit type microcontroller mentioned herein above. A more efficient choice is a microcontroller that enables sampling and storing the samples for later analysis by the processor, rather than performing the analysis in real time, which requires the processor to be awake during the sampling operations. This distinction will be described further for FIGS. 15 and 16.

The processor or CPU 100 is coupled to a transceiver 106 for communicating via antenna 108 with other nodes in a wireless network (See FIGS. 1 and 2) of shipping containers equipped with the intelligent latch monitors 34 according to the present invention, base stations 42, and the "backend system" or central office yard server 12. The transceiver 106 in the exemplary embodiment described herein performs communication reception and transmission under the control of the CPU 100 and, in this embodiment, autonomously functions as a mesh router forwarding packets on behalf of other client functional units in the latch monitor circuit 128. The transceiver 106 (also known as the "Zigbee® radio 106") is coupled to an internal antenna 108 in the illustrated embodiment. In other embodiments, an external antenna may be used. The choice of technology for the radio communication function of the latch monitor 34 is not confined to the ZigBee® system or to the use of a mesh type network. Other systems and protocols may be employed. Further, in future embodiments, it is possible, and may be advantageous to employ multiple radio technologies (e.g., ZigBee®, 900 MHz, UWB, cellular, or others).

Continuing with FIG. 5, the latch monitor circuit 128 further includes a power supply and controller section 110 ("power supply 110"). The power supply 110 includes a battery (not shown but enclosed within the latch monitor unit 34) that supplies current to all of the subsystems in the circuit 128. The battery in the illustrative example may be a Lithium ion type providing nominally 3.6 volts DC. The power supply 110 is monitored and regulated under the control of the CPU 100 to maximize the life span of the battery. Algorithms implemented in the software turn off the individual subsystems in the latch monitor circuit 128 when they are not in use. Further, the supply voltage is monitored so that a condition of low power, or an intrusion event, for example, will enable the latch monitor 34 to transmit an alert or other message via an alert sequence before the power supply expires. Further details of the power supply 110 and its power management functions will be described in regard to FIGS. 14, 15, and 16.

The circuit 128 of the latch monitor 34 further includes a real time clock 112, a GPS (Global Positioning System) receiver 114, and a motion sensor 116, all coupled to the CPU 100 to utilize or control their respective functions. The real time clock 112, which is read and written to as necessary, provides timekeeping in the event that the GPS receiver 114 is unable to lock onto satellite signals. The GPS receiver 114 used in this illustrative example may be the type SiRF GSC2x GPS chipset available from USGlobalSat, Inc., City of Industry, Calif. 91745, an affiliate of Globalsat Technology Corporation of Taipei, Taiwan. As is well known, a GPS receiver functions to determine the latitude and longitude coordinates of the GPS receiver 114. Software running on the CPU 100 queries the GPS receiver 114 using algorithms to accurately determine the location of the latch monitor 34 and the container to which it is attached.

The motion sensor 116 in this example is a so-called "at rest" device that detects physical movement or vibration of the unit in which the motion sensor is incorporated. Information provided by the motion sensor 116 may be used as part of a routine to awaken the CPU 100 or other circuits, or to provide an input to a tampering detection program. This sensor 116 is a passive device that functions as a normally closed switch when at rest, then opens when disturbed. A suitable component is a type SQ-SEN-200 available from SignalQuest, Inc. of Lebanon, N.H. 03766. In operation, a gentle disturbance will result in one or more short duration "opens." A more aggressive jolt results in much longer open periods. Software running on the CPU 100 determines when such physical movement or disturbance begins and ends, and determines the severity of the motion. For example, if the disturbance exceeds a threshold for duration or magnitude, or both, an "in motion" state will be detected and the CPU then signals the movement event to an event logger in the CPU 100.

Continuing further with FIG. 5, the circuit 128 of the latch monitor 34 includes a status indicator 118 that may report certain calibration, operational (e.g., a "heartbeat"), and diagnostic routines or conditions in process or previously logged. An array of LED lights S1, S2, S3, and S4 ("LEDs"), respectively given reference numbers 120, 122, 124, and 126 and driven and controlled by the CPU 100, is coupled to the status indicator 118. The LEDs 120-126, though controlled by the CPU 100 may be enabled or disabled via commands initiated by the backend 12 ("yard server") software and sent via the wireless interface. In one illustrative embodiment (See FIG. 4), the LEDs may be programmed as follows: LED "A" turns ON when a radio communication is in progress; LED "B" turns ON when the GPS function is active, blinking with each sentence received; LED "C" turns ON when a sensor reading is being performed; and LED "D" turns ON when there is a power measurement pending or in progress. Each respective LED turns OFF when the operation of the function is completed. The LEDs may be operated in several modes, including OFF, ON, or blinking. An LED that is ON may have the appearance of being DIM (a rapidly blinking mode, with a repetition rate of approximately 10 Hz) or BRIGHT (a continuously illuminated LED). In this description, an LED that is ON is assumed to be ON continuously unless otherwise specified.

The individual functions of the LEDs is described as follows. LED A (120) corresponding to task one (1), communications monitor, will be ON dimly (e.g., blinking at a 10 Hz rate) when the unit is attempting to establish a communication link with a base station or a back end station. LED A (120) blinks OFF when transmitting, then becomes ON while listening for a reply from a base station. For example, when a latch monitor 34 comes within range of a base station 42, LED A (120) will "wake up" in a dim ON state as it tries to join, i.e., "associate," with the personal area network (PAN), then blink OFF (only for about one-half second) during the brief time it transmits a "check in execute packet," (lock to base), then turn ON while listening for a reply from the base station, then, blink a few times (LED OFF to transmit the next packet and then ON to await the reply, for however many packets are needed), then turn OFF, indicating that the base station has completed the current transaction with the latch monitor 34 and allowed it to disconnect.

LED B (122) corresponding to task two (2), GPS monitor, blinks in time to the reading of GPS strings from the GPS receiver 114 in the latch monitor 34. After obtaining valid coordinates, the blinking cadence will change slightly so that it appears to be ON more often, indicating a valid "fix." Additional readings will follow for approximately 30 seconds, or for a period sufficient to improve the resolution of the coordinate values.

LED C (124) corresponding to task three (3), sensor monitor, becomes illuminated ON when a sensor reading is initiated and turns OFF when the reading is completed. This LED is ON only when a sensor reading is taking place. The duration of time it is ON indicates whether the door actually opened (time=2 seconds) or whether the reading indicates a door closed or a "jiggle," i.e., a false open reading (time=one second). Also, during the power on self test sequence (POST), this LED 124 may begin indicating the blink codes for the POST after the latch monitor 34 completes the boot up cycle.

LED D (126) corresponding to task four (4), power management, is illuminated to indicate monitoring battery levels during this task. It is ON dimly during the period when the latch monitor is waiting to take a power measurement, the sequence does not operate continuously but at intervals to save power. The interval timing is controlled by a parameter called "Power Supply Access Time" (PAST).

The LED blink codes are produced on the LEDs A-D immediately after the POST routine has completed. The blink codes may also be presented upon a reset event, in which case an abbreviated POST may be run. In this illustrative example, three sets of LED ON codes are displayed in a sequence, each set illuminated for approximately 400 milliseconds (ms), and each set separated by a 100 ms interval in which all LEDs are ON 50 ms and OFF 50 ms. Following the third (last) set, all LEDs are OFF for approximately 1500 ms. The indications of the blink code sets are defined in the order of LEDs A; B; C; and D. Thus, the first set of blink codes, when ON for 400 ms indicates respectively: data flash fails; GPS fails; (reserved); and (reserved). The second set of blink codes, when ON for 400 ms indicates respectively: SSN (silicon serial number) read fails; Zigbee fails; sensor fails; and power monitor fails. The "SSN" is a unique 48 bit number (a Global Unique ID) stored in a one wire, serial ROM that identifies, during the POST routine upon start up, the particular latch monitor to whatever network it may be connected to. It is available as an integrated circuit from Maxim/Dallas Semiconductor, Richardson, Tex. as part no. DS2401. The third set of blink codes, when ON for 400 ms indicates respectively: RTC (real time clock) power loss; RTC not running; (reserved); and, internal flash fails. These blink codes enable the installer or technician to identify functional problems with the latch monitor 34 reported during the POST routine. If three quick blinks occur with nothing in between them, all sections of the latch monitor circuit 120 are functional.

The array of LEDs 120-126 may also be used during a calibration sequence (to be described) that is performed when the latch monitor 34 is installed on a container 22 or reset following an unauthorized or incidental event affecting the sensor operation. For example, the row of LEDs 120-126 may be energized to flash rapidly in one direction to indicate to an installer to open the container door, and flash in the opposite direction to indicate or instruct the installer to close and repeat the open/close door sequence several times to enable the latch monitor circuit 128 to record minimum/maximum values for all of the sensors in the sensor array. Further, the sensor LED may be energized to flash or blink during a period of calibration for the latch monitor to establish a "neutral" door open zone, as will be described.

Figure 6:
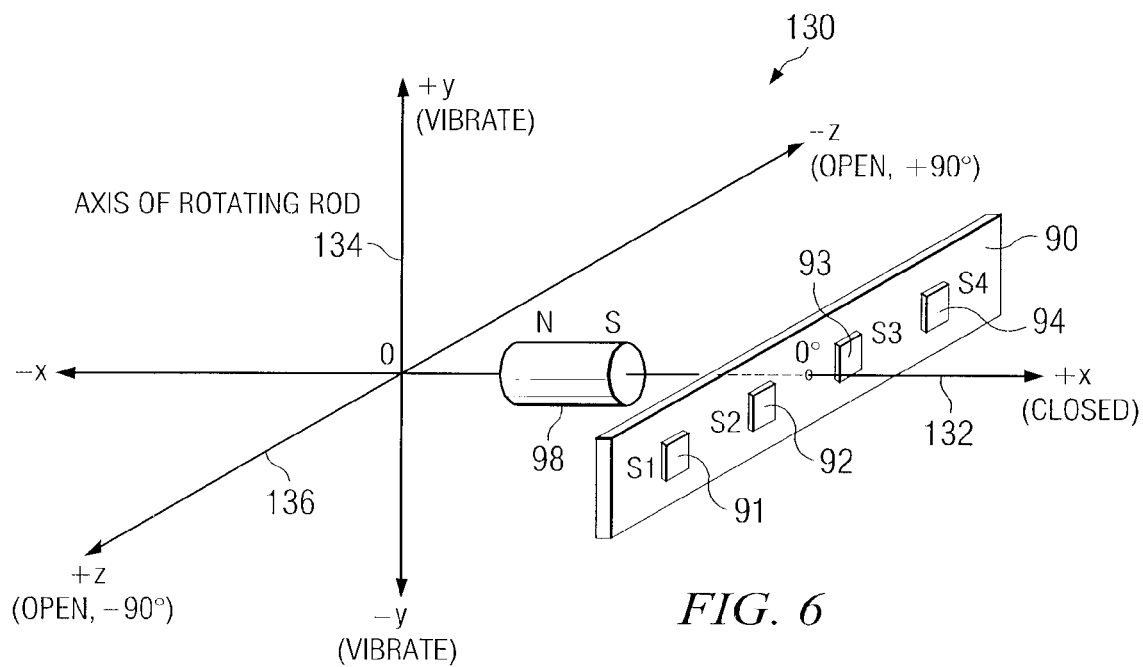
FIG. 6 illustrates a coordinate diagram of one embodiment of a magnetic field disturbance sensor that may be used in the latch monitoring device shown in FIG. 4.

FIG. 6 illustrates a rectangular coordinate diagram 130 of one embodiment of a magnetic field disturbance sensor for use in the latch monitor 34 shown in FIG. 4. The coordinate system 130 includes orthogonal axes x,y, and z (respectively 132, 134, and 136), the magnet 98 positioned along the positive x axis 132 with its north pole located near the origin and the south pole proximate the sensor array 90. The sensor array 90, including the sensors 91, 92, 93, and 94, is shown aligned in a straight line or a geometric tangent disposed parallel with the z axis 136. The center point of the array, midway between the sensors S1 (92) and S3 (93) and designated in the figure as zero degrees (0°), is aligned along the x axis 132, just beyond (in a positive direction) the south pole of the magnet 98. Although the sensor array 90 is shown as an assembly of sensors on a planar member designated as the sensor array 90, the planar member is shown in this embodiment to represent that the individual sensors 91-94 are in a fixed relationship with each other within the latch monitor 34. In an alternate embodiment, it is possible to arrange the sensor array 90 along a curved line or arc, wherein the arc is within the same plane as the rotation of the magnet 88 and the radius of the arc rotates around a center along the x axis, as if the sensor array 90 were bent into an arc that turns the ends of the sensor array 90 inward toward the origin of the x, y, and z coordinates.

The y axis 134 corresponds to the axis of rotation of the rotating rod 36 of the latch mechanism 32. The magnet 98, when the rotating rod 36 is rotated, will be caused to move in the x-z plane (represented by the x axis 132 and the z axis 136) of FIG. 6, generally within the quadrant bounded by the positive x 132 and z 134 axes. Such movement corresponds to the normal range of motion while opening and closing the latch mechanism 32. Motion in the direction of the negative x 132 and z 134 axes may be incidental or evidence of tampering. Motion in the direction of the positive or negative y axis 134 may correspond to incidental movement of the latching mechanism. One example of incidental motion along the y axis 134 is vibration of the shipping container 22 and/or latch mechanism 32 during movement of the shipping container 22 and may typically be ignored. Such motion in the y axis direction will be reflected in reduced amplitudes, but exhibit the same zone data profile as the signatures. Motion in the minus x direction will typically be reflected as a weakened profile. Another example of apparent signal variation along the negative x axis may indicate an attempt to interfere with the magnetic field in the space between the magnet 88 and the sensor array 90. As will be apparent, the sensors 91-94 are positioned to sense the intensities of the magnetic field produced by the magnet 88 (98) at the respective sensor locations. Motion in the z axis direction will typically be reflected in a change in the profile and may be evidence of tampering. One such example is an attempt to rotate the lever 38 of the rotating rod 36 away from its closed and latched position. The resulting pattern or signature of the field strengths from the set of magnets is interpreted according to algorithms applied to the sensor measurements by the CPU 100 in the latch monitor circuit 120 of FIG. 5.

Figure 7:
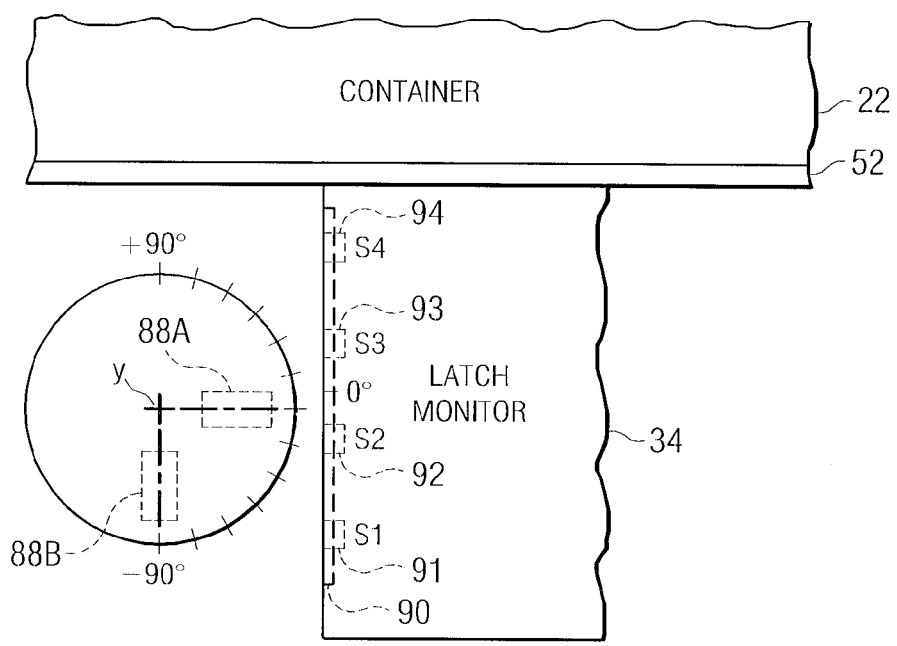
FIG. 7 illustrates a plan view/cross section view of a portion of one embodiment of a magnetic field disturbance sensor that may be used in the latch monitoring device shown in FIG. 4.

Referring to FIG. 7 there is illustrated a plan view/cross section view of a portion of one embodiment of the magnetic field disturbance sensor that may be used in the latch monitoring device 34 according to the present invention. This view is downward along the y axis, from the positive end toward the negative end of the y axis, coincident with the axis of rotation of the rotating rod 36. The outer surface of the rotating rod 36 is shown coincident with a semicircle centered on the axis of rotation (i.e., the y axis) of the rotating rod 36 and ranging from a minus 90 degree (−90°) angle through a zero (0°) degree reference aligned with the center of the array of sensors 90 to a plus 90 degree (+90°) angle. It will be noted that the axis of rotation of the rotating member (the rotating rod 36 in this embodiment), the zero degree reference, and the center of the sensor array 90 are aligned along a single straight line. Also shown are the container 22 and the latch monitor 34 attached to a door 52 of the container 22 as shown in FIGS. 1, 3, and 4. Included in the drawing are the relative positions of the sensors S1 (91), S2 (92), S3 (93), and S4 (94) with respect to the rotating rod 36 and the magnet 88 embedded therein. As described previously, the magnet 88 in this embodiment rotates through an arc when the rotating rod 36 is rotated between a closed position at zero degrees (0°), with the magnet 88 shown as magnet 88A in phantom and aligned with the 0° reference, and an open position in which the magnet 88 is shown as magnet 88B in phantom and aligned with the −90° angle. In another, mirror image embodiment, when the latch monitor 34 is installed on the opposite side of a rotating rod 36, the rod 36 is rotated between a closed position at zero degrees (0°) and an open position aligned with the +90° angle.

Figure 8:
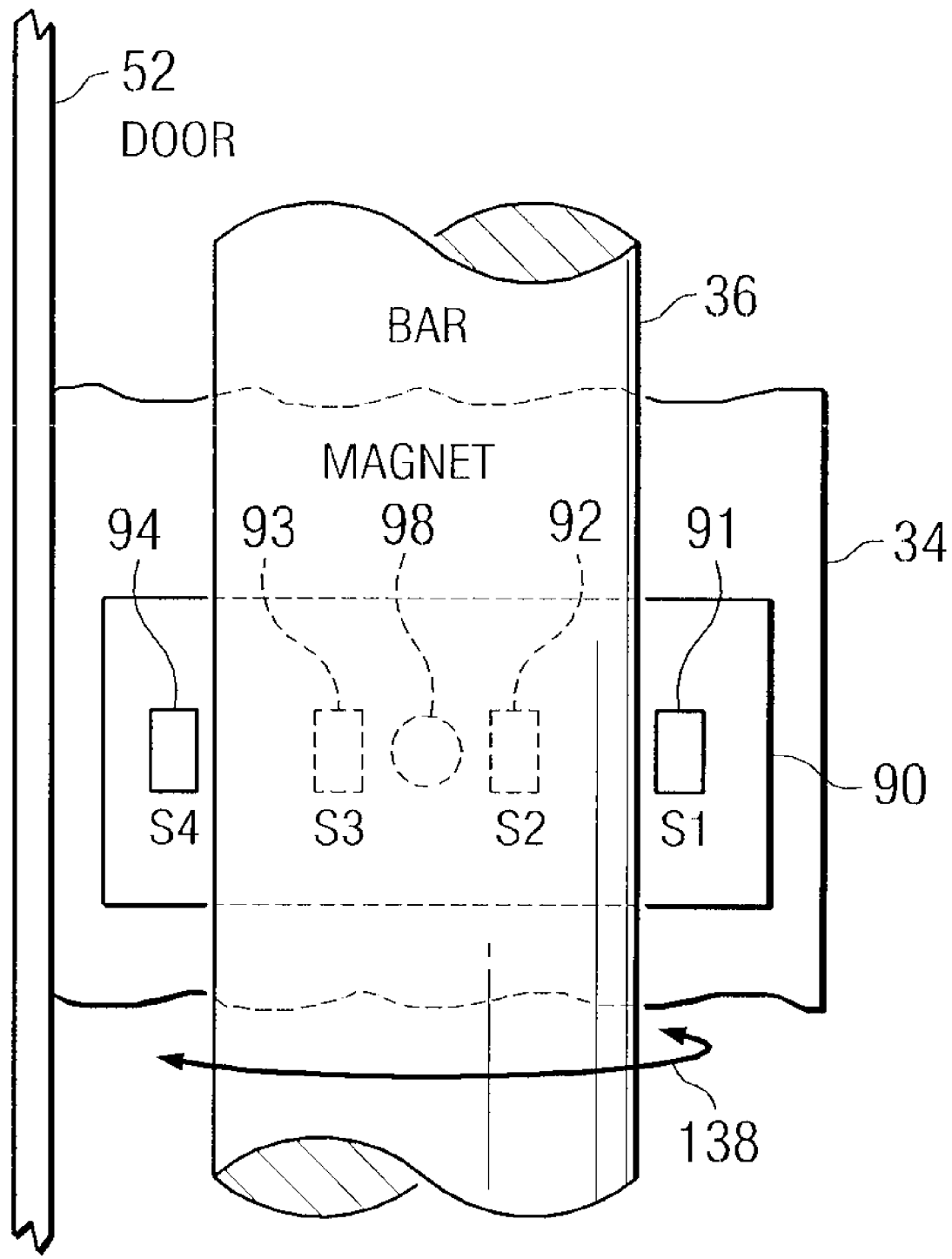
FIG. 8 illustrates a side view of the portion of the embodiment shown in FIG. 7.

Referring to FIG. 8 there is illustrated a side view of the portion of the embodiment shown in FIG. 7. The view in FIG. 8 is along the x axis when the rotating rod 36 and the magnet 88 are in a fully closed and latched position. The closed and latched position corresponds to the position of the magnet 88 in alignment with the point midway between sensors S2 and S3. The magnet 88 and the sensors S2 (92) and S3 (93) are shown in phantom as being on the opposite side of the rotating rod 36 in this view. Rotation of the rotating rod 36 is indicated by the arc 138.

Figure 9:
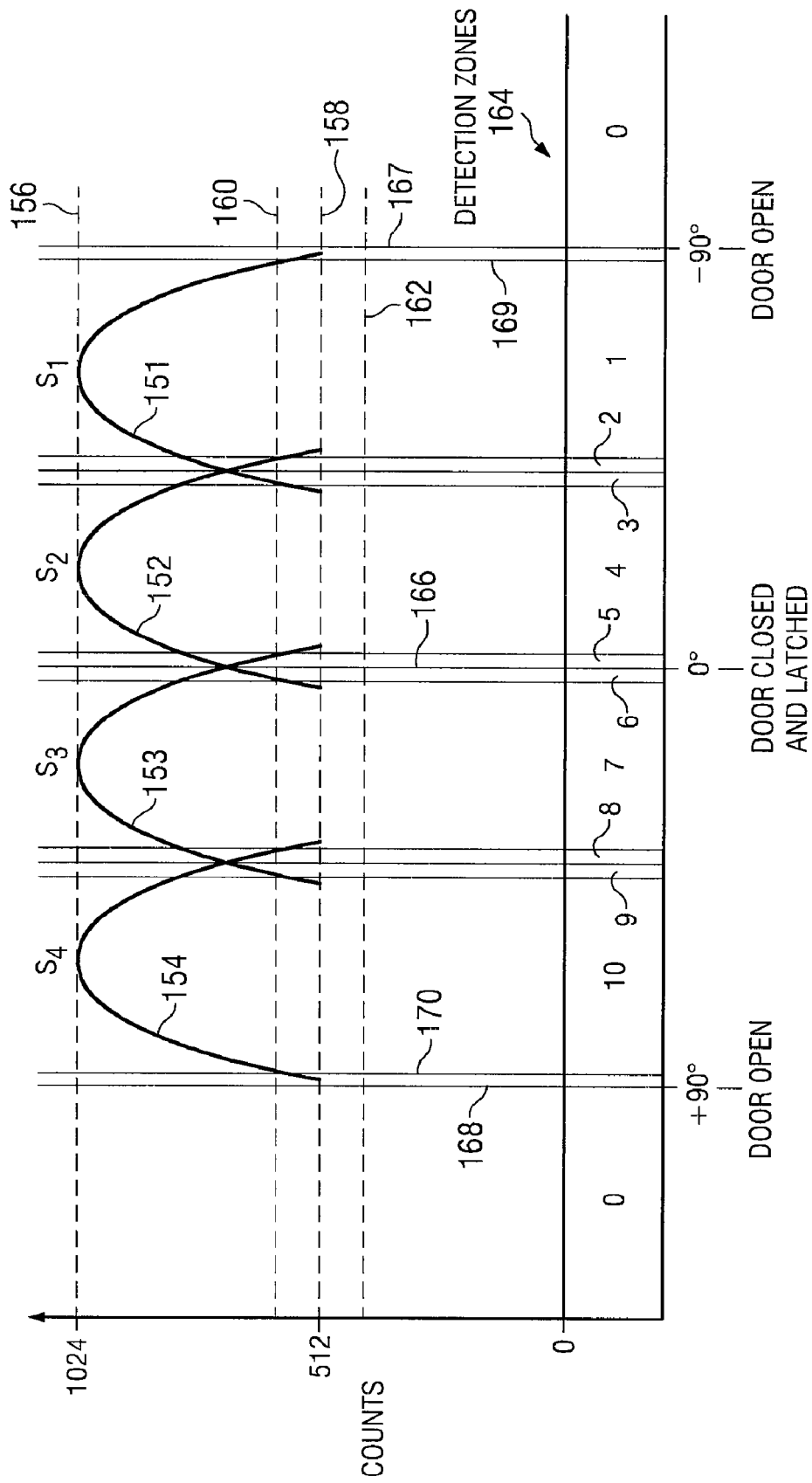
FIG. 9 illustrates a graph of signal outputs from the array 90 of sensing elements of the embodiment of the magnetic field disturbance sensor shown in FIGS. 6, 7, and 8.

Referring to FIG. 9 there is illustrated a graph of signal outputs from the array 90 of sensing elements of the magnetic field disturbance sensor shown in FIGS. 6, 7, and 8. The signal outputs S1 (151), S2 (152), S3 (153), and S4 (154) correspond to the maximum values of signals provided respectively by the sensors 91, 92, 93, and 94 as they are scanned at least several times per second. In the illustrative example, the array of sensors 94 may be scanned two to four times per second and yield useable data to detect all relevant events that may occur with respect to the latch mechanism 32, yet not consume more power from the battery than is necessary. In the graph, the peak value shown on the vertical axis corresponds to the maximum number of counts of the 10 bit A/D, or 1024 counts representing the strongest amplitude signal from a sensor. This value is the peak count value 156. A nominal or median threshold 158 (also called a neutral baseline herein) for detection is set during a calibration procedure (to be described for FIG. 17 herein below) at approximately half the number of counts, or 512 counts. In practice this actual median value 158 may vary for each sensor S1-S4, and is also influenced by nearby magnetic fields, the noise present, temperature effects, etc. The calibration procedure further allows for drift in the parameters of the latch monitor 34 in setting the level of the actual thresholds 160, 162 for each sensor in the array 90. The horizontal axis of the graph of FIG. 9 represents the angular displacement of the magnet 88 and the rotating rod 36 through an angle of 180°. This angle may be visualized as approximately +or −90° either side of the axis of alignment of the magnet 88 when the container door 22 is closed and the rotating rod 36 is latched. This alignment also corresponds to the respective sensor output signals 152, 153 from sensors S2 and S3 that are substantially equal and both above the median threshold value 158. This condition is indicated by the dashed line that intercepts the vertical axis of the graph at 512 counts.

Also illustrated along and below the horizontal axis of FIG. 9 are the approximate positions of one example of a set of detection zones 164 defined as segments of the angular displacement of the magnet 88 corresponding to the magnet positions ranging from a fully open door latch mechanism 32 and a fully closed and latched door mechanism 32. The detection zones 164 are defined for positions of the magnet 88 rotating in either direction—i.e., from either left or right side—toward the closed or latched position 166 aligned with the center of the sensor array 90, depending on which side of the rotating rod 36 the latch monitor 34 is installed. It will be noted in this example that the detection zones 164 are not uniform. There are two reasons for this. One reason is that the angular positions of the magnet 88 that give rise to responses in the sensors 91-94 are not evenly distributed or spaced when projected from the centerline of the rotating rod 36 onto the plane of the array of sensors 90, which are evenly spaced from one another. Another reason is because of the way in which the spacing of the sensor signals S1-S4 is related to the conditions of closure and opening of the latch mechanism 32 that the array of sensors 90 is configured to resolve. The relative width of the detection zones 164 diminishes as the rotating rod 36 approaches and enters angular displacements where the outputs of the one or two sensors providing a reading near the threshold level (number of counts) is low and approaching the actual threshold 160 or 162. This condition is useful when the magnet 88 is producing a response in sensors 92 and 93 near a fully latched condition at the position 166 because that is where the resolution of the sensor array 90 needs to be at its maximum.

There are twelve (12) detection zones 164 defined in the illustrated embodiment shown in FIG. 9, identified with reference numerals 0, 1, 2, through 9, 10, and 0. The zero (0) numerals correspond to sensor readings indicating a fully open door, in either direction, that is, at or beyond the intersection of the sensor characteristics 151, 154 and the threshold 160, or alternatively, the threshold 162. Thus, there are, in effect, two mirror image sets of zone definitions. One set ranges from zone zero at the line 169 in FIG. 9 (door 52 open), through 1, 2, 3, 4, and 5 to midway between zones 5 and 6 (door 52 closed and latched, at 0°). The other set ranges from zone zero at the line 170 in FIG. 9 (door 52 open), through 10, 9, 8, 7, and 6 to midway between zones 5 and 6 (door 52 closed and latched, at 0°). The zone zero is defined in two places in this example, one near −90° at line 167 and the other near +90° at line 168, which correspond respectively to an open door for the two possible thresholds 160 and 162. The two sets enable use of the latch monitor 34 on either side of the rotating rod 36, or for use on either of the two doors 52 of a typical shipping container 22, for either clockwise or counter clockwise (CW or CCW respectively when looking downward along the rotating rod axis). When the low-numbered set is in use, detection zone 164 numbers 0 (on the right in the figure) through 7 are valid; when the higher numbered set is in use, zone 164 numbers 4 through 0 (on the left in the figure) are valid. In any case, a fully closed and latched door 52 lands the magnet 88 substantially between sensors S2 and S3 (and between detection zone 164 numbers 5 and 6). In other embodiments, the 1/0 and 10/0 boundaries 169, 170 may be defined at angles substantially less than 90 degrees.

Continuing with the description of FIG. 9, the signal outputs 151-154 for the sensors 91-94 shown approach the maximum or peak values 156 of the sensor outputs at the instant the field of the magnet 88 is nearest a particular sensor. If, for example, the magnet 88 is aligned with (i.e., nearest) sensor S3, its output signal will be at or near its peak value 156 and the sensor output signals S1, S2, and S4 of the other sensors will be lower in amplitude and either increasing or decreasing depending whether the magnet 88 is approaching or withdrawing from proximity to a particular sensor. The detection scheme notes whether the respective signals from the sensors S1-S4 are above or below the thresholds 160, 162 (the calibrated thresholds 160, 162 are represented by the dashed horizontal lines intercepting the vertical axis above and below the median count value 158 at 512 counts), and which one of the signals from two adjacent sensors is the stronger of the two, according to the following detection zone definitions, all expressed with respect to the calibrated threshold 160 for the positive-going signals in this example:

Zone 0: all sensors below the calibrated threshold 160 (beyond line 169 on FIG. 9).
Zone 1: S1 is the only sensor above the threshold.
Zone 2: S1 and S2 are above the threshold, S1 is stronger than S2.
Zone 3: S1 and S2 are above the threshold, S2 is stronger than S1.
Zone 4: S2 is the only sensor above the threshold.
Zone 5: S2 and S3 are above the threshold, S2 is stronger than S3.
Zone 6: S2 and S3 are above the threshold, S3 is stronger than S2.
Zone 7: S3 is the only sensor above the threshold.
Zone 8: S3 and S4 are above the threshold, S3 is stronger than S4.
Zone 9: S3 and S4 are above the threshold, S4 is stronger than S3.
Zone 10: S4 is the only sensor above the threshold.
Zone 0: all sensors below the calibrated threshold 160 (beyond line 170 on FIG. 9).

The level of the threshold 160 or 162 is set during a calibration procedure (See FIG. 17) to adapt a particular sample of the latch monitor 34 to a particular container 22. In this example, the threshold 160 will be substantially above the median 512 counts—the neutral baseline 158—as follows. Before describing the calibration procedure however, several features and initial conditions need to be mentioned. First, the detection scheme is configured to respond to both positive and negative swings of the sensor output signals 151-154 relative to the median or neutral baseline 158 set at half the available number of counts (i.e., 512) of the 10 bit A/D. Positive sensor signals—those having excursions between 512 (neutral baseline 158) and 1024 counts 156—correspond to the proximity of the south pole of the magnet 88 to the sensor array 90. Conversely, negative sensor signals—those having excursions between 512 (neutral baseline 158) and zero counts—correspond to the proximity of the north pole of the magnet 88 to the sensor array 90.

Second, an increasing signal corresponds to a count value moving away from the median or neutral baseline 158; while a decreasing count value corresponds to a count value moving toward the median or neutral baseline value 158. Third, the median or neutral baseline 158 will be expanded during the calibration procedure to a threshold "window" to account for noise and externally influenced drift such as the effects of temperature variations during transit, nearby magnetic fields that vary from location to location, etc. The threshold window thus will be defined by a maximum number 160 and a minimum number 162 of counts, corresponding respectively to a maximum threshold 160 and a minimum threshold 162. Accordingly, the thresholds 160 for installations in which the south pole of the magnet 88 is proximate to the sensor array 90 is set to the maximum member of counts because the sensor signals will be positive excursions of the count values. Similarly, the thresholds 162 for installations in which the north pole of the magnet 88 is proximate to the sensor array 90 is set to the minimum number of counts because the sensor signals will be negative excursions of the count values.

In one example of setting the thresholds 160, 162, one may begin with obtaining a figure for the noise and drift values. Among a number of tested units, the noise range was measured to be in the range of 16 to 32 counts. Externally influenced drift in one measurement session was −16 counts. Thus, if the drift=−16 counts and the noise=18 counts, a threshold window based only on these factors is the range between 496 (512−16) counts and 530 (512+18) counts, respectively the minimum threshold 162 and the maximum threshold 160. However, these are "open latch" (corresponding to an open door) values that do not take into account the effects of the actual installation and operation of the latch monitor 34 next to the rotating rod 36 with the magnet 88. Accounting for these effects is accomplished during an automatic calibration process (See Task 5, described herein below with FIGS. 10 and 17) performed upon installation of a new or replacement unit, replacement of a battery, following a tampering incident, severe magnetic field encounter, etc., all of which are examples of situations when the latch monitor 34 may be in an inactive or OFF state.

Figure 17:
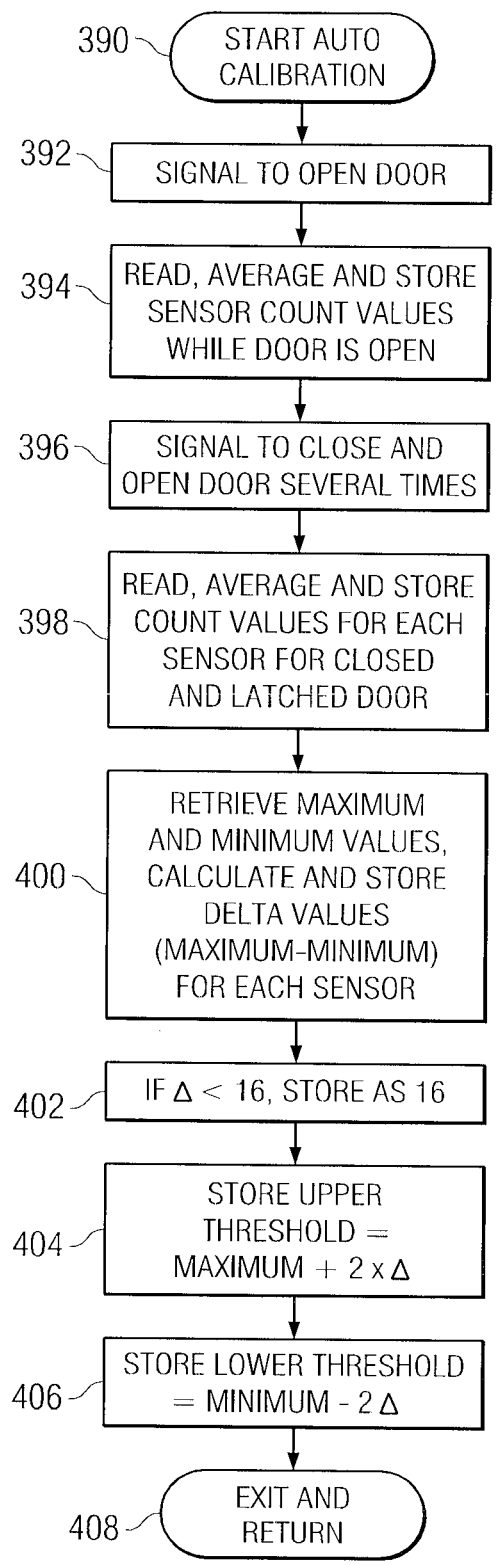
FIG. 17 illustrates a flow chart diagram of a calibration Task 5 for calibrating the magnetic disturbance sensor of the embodiment of FIGS. 4 through 10.

The calibration process (Refer to FIG. 17), which is Task 5 of the software architecture block diagram illustrated in flow chart form in FIG. 17, may be used to accomplish three functions. First, it sets the median or neutral baseline values 158 for an open latch mechanism 32. Second, it determines the count values for the rotating rod 36 of the latch mechanism 32 moving through its range of motion from closed to open. Third, it calculates the "window" defined by the thresholds 160, 162. Task 5 may be performed when the latch monitor 34, following installation on a container door 52, wakes up for the first time. The calibration process is performed with the latch monitor 34 installed on the container door 52 next to the rotating rod 36 selected for the installation. When Task is called, typically by a call from the base station or a signal by the installing technician directly to the latch monitor 34, the process begins at step 390 by advancing to step 392 to trigger the LEDs 120-126 to blink in a sequence from right to left to request that the door 52 be opened—i.e., to instruct the installer or technician to open the door 52 by operating the latch mechanism 32. Advancing to step 394, the CPU 100 causes the latch monitor circuit 128 to read the outputs 151-154 of all of the sensors 120 times while capturing (reading), averaging, and storing the maximum and minimum count values. At step 396, the LEDs are again triggered, to blink in a sequence from left to right to request the technician to close and open the door 52 several times. In step 398 the technician then operates the door 52 and the door latch mechanism 32 through complete cycles of movement including latching the door 52 in its fully closed condition while the CPU 100 causes the latch monitor 34 to read all of the sensors S1-S4 to capture (read), average, and store the maximum and minimum count values.

Proceeding to step 400, the CPU 100 retrieves the values stored in step 394 to determine the difference value between the stored maximum and minimum count values for each sensor S1(91)-S4(94). In step 402, if the difference value is less than 16 counts, the number of counts is set to 16. Next, in step 404 the difference value (i.e., a member≧16) is doubled and added to the maximum stored value to define the upper (maximum) threshold 160. Similarly, in step 406, the difference value (i.e., a number≧16) is doubled and subtracted from the minimum stored value to define the lower (minimum) threshold 162. The process of calibration ends and exits at step 408.

It will be appreciated that the calibration process, besides taking account of all of the possible positions of the door latch mechanism 32 and the individual sensitivities of the sensors S1-S4, sets the thresholds 160, 162, and the "threshold window" between them at a minimum nominal range of five (5) times the width of the noise window of, in this example, 16 counts. The value of the multiplier (five in this example) may be user programmable. Thus, the latch monitor 34 sensors S1-S4 should only "see" count values outside the "threshold window" when the magnet 88 in the rotating rod 36 is near a particular sensor. It is important to note that the above description is one of many possible particular examples, and is presented to illustrate the principles of operation in calibrating the sensors of the latch monitor 34 of the present invention.

A further use of the maximum and minimum average values determined in step 398 for each sensor S1-S4 (120-126) with the door 52 closed and latched is as a signature or fingerprint for the latched door 52 for the combination of the container 22 and the latch mechanism 32 including the latch monitor 34. The maximum value set of sensor readings is used when the south pole of the magnet 88 is nearest the array of sensors 90. The minimum value set of sensor readings is used when the north pole of the magnet 88 is nearest the array of sensors 90. The signature of a closed and latched door 52 (i.e., a closed and latched door latch mechanism 32) is essential in determining whether an event involving movement of a part of the latch mechanism 32 is authorized or is incidental or is likely a tampering attempt.

The difference between the thresholds (obtained as described) and the signature is as follows. The threshold levels 160, 162 established in steps 394 and 396 by the calibration procedure define a reference line 166 for determining the location of the magnet 88 in the x-z plane as it rotates when the rotating rod 36 of the latch mechanism 32 is rotated to latch or unlatch the door 52 of the container 22. The algorithm compares the relative amplitudes of the sensor signal outputs 151-154 with respect to the corresponding threshold 160, 162 and to each other to determine the location of the magnet 88—i.e., the angular position in the x-z plane of the magnet 88. The signature is a single set of individual sensor values 151-154 determined during step 388 for a closed and latched door 52 of a particular container/latch monitor combination. The single set of sensor values 151 to 154—four data points—is unique to that door/latch monitor combination, and thus very useful in determining whether a container breach or attempted breach has occurred.

It will be appreciated that the novel combination of the magnetic sensing design and the analysis and interpretive processing of the signal outputs of the array of sensors 90 enables a substantial ability to detect and report a wide range of conditions of the latch mechanism 32 of a shipping container door 52. These conditions include authorized operations of the latch mechanism 32 and unauthorized incidents (tampering) as well as incidental events that may occur during storage, loading and unloading, and transit. The sensor system in the latch monitor 34 is configured to detect and report a range of authorized operations that correspond to a closed and latched door, a closed but unlatched door, a partially open door, and a fully open door. It is also configured to detect movement of the latch components due to buffeting by the wind and to vibration and bump shock such as encountered during transit of the container 22 or handling of the container in a container yard 60, etc. Further, the sensor system detects movement of the components of the latch mechanism 32 that can only occur during efforts to break the closed and latched condition by application of external force or attempts to open the latch mechanism at times when the container 22 is not scheduled for unloading, inspection, or loading. Moreover, the sensor system is capable of detecting efforts to disarm or impair the sensing ability of the sensing mechanism by using external magnetic fields or shielding in proximity to the latch monitor 34. Even electromagnetic events occurring during thunderstorms may be detected and result in a logged detection event. The logged events can be retrieved and reported to a base station 42 or yard server 12, or from a handheld terminal 28 within or outside a container yard 60 by authorized inspection personnel such as government customs officers or other security or transportation officials.

Even though the array of sensors 90 are disposed in a row parallel to the z axis, it is still possible to distinguish movements of the magnet 88 in the x or y directions. Assuming the door 52 of the container 22 is closed and latched, movement of the magnet 88 in the x direction (i.e., toward or away from the door 52), without changing the sensor outputs in the z direction, will affect all of the sensor output levels 151-154 (See FIG. 9) by a proportional amount, that is, they will all increase or decrease together in proportion to the displacement of the magnet's position. This is in contrast to the movement of the magnet 88 in the x-z plane about they axis, where the outputs 151-154 of the sensors in the x direction will vary as the magnet 88 moves in the z direction. This example illustrates a circumstance in which an attempt is made to pry the rotating rod away from the latch monitor 34 or vice versa.

Similarly, again assuming the door 52 of the container 22 is closed and latched, movement of the magnet 88 in they direction will again affect all of the sensor output signals 151-154 in the same way, in contrast to movement of the magnet 88 in the x-z plane, where the outputs 151-154 of the sensors will have essentially no change in they direction; in fact, they axis sensor outputs 151-154 will nominally be zero through out the range of motion of the rotating rod 36 if the latch monitor 34 has been properly installed. This example illustrates a circumstance in which an attempt is made to move the rotating rod 36 tip or down, or more likely, it may just indicate normal vibration or jarring of the rotating rod 36 during transport of the container 22.

In another example, the sensor array 90 can easily determine whether an external magnet is being manipulated close to the latch monitor in an attempt to tamper with it. To illustrate, suppose the magnet 88 is aimed at sensor S3 (124) and the latch monitor 34 detects an increased amplitude of the output of sensor S1 (120) while noting also that sensor S2 (122) is still in the neutral state (i.e., its output is below the threshold). This is an indication of the presence of the external magnet close to sensor S1 (120) because both S1 (120) and S3 (124) are indicating high amplitudes, which cannot happen at the same time without stimulating sensor S2 (122) at the same time.

These results accrue because the field strengths and the corresponding sensor signal count values 151-154 are all relative. The system is configured to regard sensor output signals 151-154 that change in the same direction together as indicating an unauthorized event or tampering. This principle is similar to the concept of common mode rejection of noise along balanced transmission lines. Thus, motion of the magnet in the x or y directions causes the signal strength of all four sensors to increase or decrease together, while the latch monitor 34 tracks motion of the magnet in the z direction.

Some specific examples of motion of the rotating rod 36 (except rotation of the rotating rod) that will trigger an event accompanied by an alert include the following. (1) If the rod moves laterally more than approximately 0.250 inch away from the latch monitor 34, a door open event will be indicated. (2) If the rod 36 moves laterally more than approximately 0.050 inch towards the latch monitor 34, a magnetic tampering event will be indicated. (3) If the rod 36 slides vertically more than approximately 0.250 inch either up or down, a door open event will be indicated. (4) If a foreign magnet is placed such that it interferes with the relative signal strengths of the sensor output signals 151, 152, 153, and 154 (i.e., the respective count values), a magnetic tampering event will be indicated. (5) If a foreign magnet is placed such that it causes a sensor 91, 92, 93, or 94 of the latch monitor 34 to "leave" its calibrated minimum/maximum window, a magnetic tampering event will be indicated. Leaving its calibrated min/max window means that the count value produced by the sensor is out of range of the calibrated min/max window and/or the count range of the input of the A/D converter 102 in the CPU 100 of the latch monitor circuit 120 shown in FIG. 5. In conjunction with the motion sensor 116 (the "At Rest" sensor), an event will occur and an alert will be issued when the container 22 begins to move and following a predetermined settling time has expired after motion of the container 22 has ceased. The predetermined settling time may be set at approximately one minute, for example. Alerts are discussed in the description for FIG. 10 at step 212.

From the foregoing it is to be understood that the sensor array 90 and the associated circuits 128 in the latch monitor 34 can detect a wide range of movement of the rotating rod 36 in all three axes and accurately distinguish both tampering events and incidental events from authorized operation of the latch mechanism 32 of the container 22. This is accomplished by interpreting signal values produced by the sensors 91-94 that exceed preset limits or which do not match a predetermined profile established during a calibration process. The latch monitor 34 is also able to detect attempts of tampering that do not involve movement of the rotating rod but do involve attempts to trick the sensor array using an external magnetic field. Further, the latch monitor can as easily detect naturally occurring events such as lightning strikes during a thunderstorm in the vicinity of the container 22. Such attempts or natural events, which distort the profile established for a closed and latched magnet 88, will be logged in memory, and cause an alert sequence to be initiated if preset limits are exceeded. The same is true of attempts to insert a magnetic shield between the magnet 88 and the sensor array 90. All data monitored by the latch monitor may be logged for later analysis and review by authorities.

Figure 10:
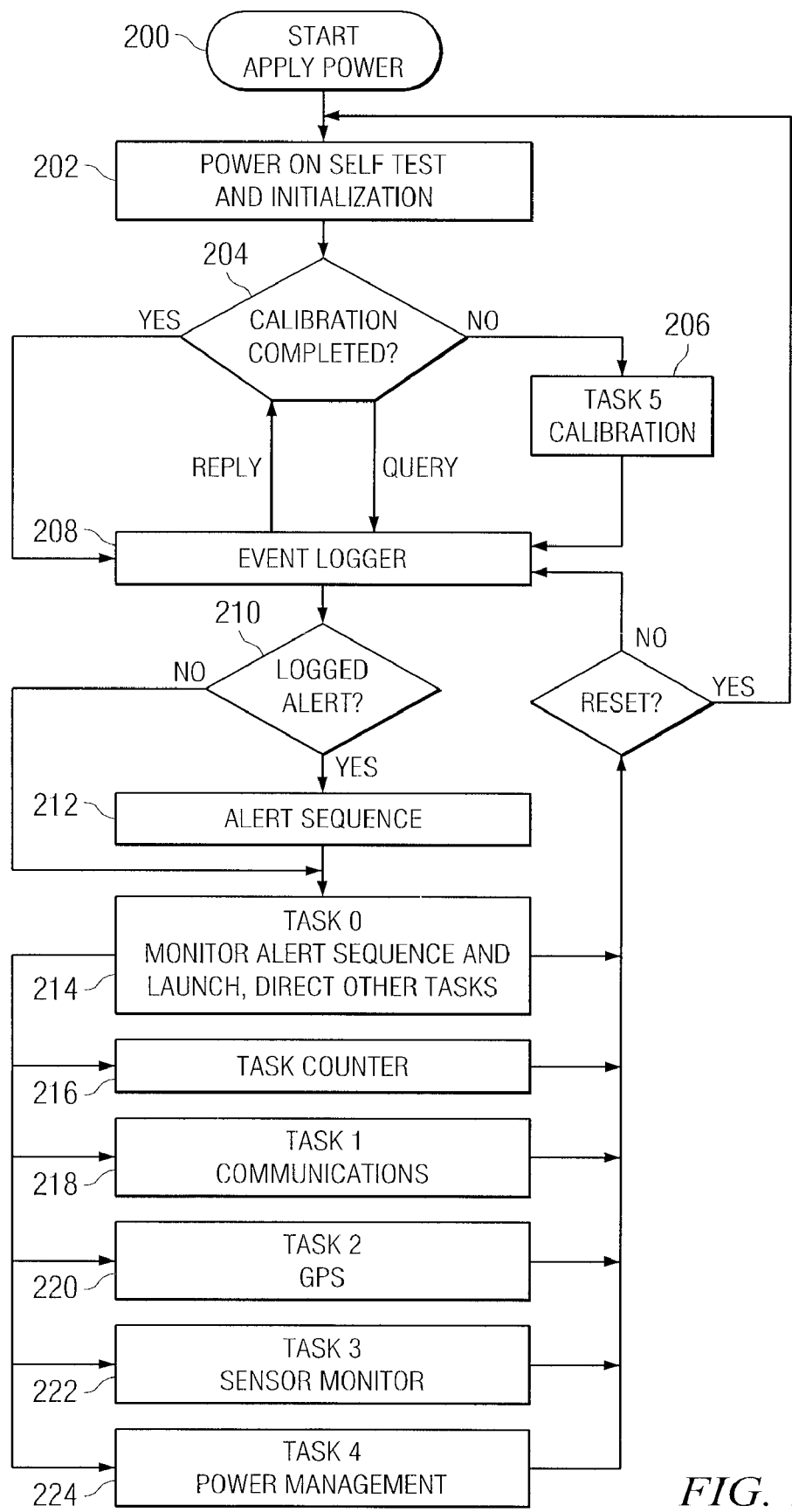
FIG. 10, illustrates one embodiment of a software architecture presented as a flow diagram for use in the latch monitor 34 of the present invention.

Referring to FIG. 10, there is illustrated one embodiment of a software architecture presented as a flow diagram for use in the latch monitor 34 of the present invention. The software is needed to manage the various processes that take place in the latch monitor 34. Software modules are included for the Tasks 1 through 5 and for other functions such as power on self test (POST), event logging, alert sequence, etc. In general, each task in the system records its own events using an event logger service. A master task, Task 0 (zero), monitors these events as they accumulate in an event logger 208 and then directs the communications, GPS, sensor monitor, and power management tasks (Tasks 1, 2, 3, and 4) as appropriate. When an alert condition is detected, the latch monitor 34 through Task 0 will attempt to communicate with the base station 42 to transfer its log contents. Once such transfer is completed, the latch monitor 34 will attempt to locate its current position via the GPS Task 2, then again attempt to transfer the log contents to the base station 42. As will be described herein below for Task 4, each task is responsible for controlling the ON-OFF state of the section of the latch monitor circuit 128 that it controls with the common goal of power conservation. Optimal control of each circuit section has been determined based on operational testing.

The flow chart shown in FIG. 10 illustrates one way in which the functions of these modules may be organized. The flow begins with the Start block 200 and advances to step (or module) 202 to execute a POST and initialization routine. The POST and initialization step is responsible for testing all functional components in the latch monitor 34. It reports errors as appropriate on the LED indicators. After initializing all of the circuit sections and calibration of the array of sensors 90, control is passed to Task 0 (zero) to manage the system operations.

Step 202 is followed by a test step 204, via a query and reply with the event logger 208, to determine whether calibration of the sensors has been completed. If the reply from the event logger 208 is negative, indicated by a letter N, then the flow proceeds to Task 5, calibration, at step 206 to perform the calibration process, then return a completion indicator (e.g., a flag bit) to the event logger 208. If a Task 5 completed bit is present, then the flow returns along the path designated Y (for YES) to step 208, the event logger, and continues to step 210 to check for an alert event indicator or alert data logged in memory. If an alert has been logged, the flow advances to step 212 to initiate and complete an alert sequence. If no new alert has been logged, the flow skips the alert sequence and enters step 214, which is Task 0 (zero). Task zero at step 214 acts as a task manager to monitor the alert sequences and to launch and control other tasks in turn with the aid or step 216, a counter, before advancing to each Task 1 through 4 as required.

Figure 11:
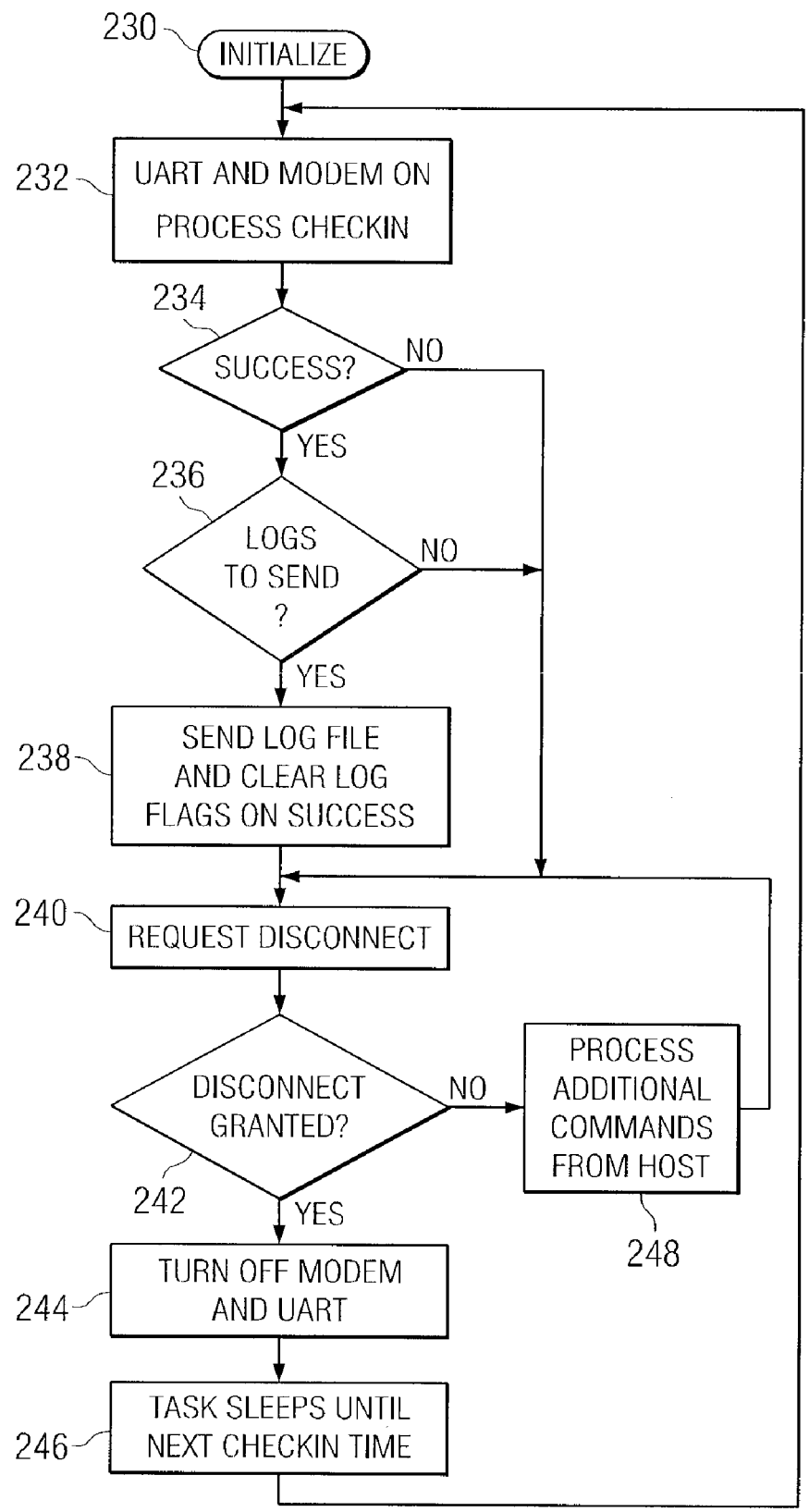
FIG. 11 illustrates a flow chart diagram of a communications Task 1 process for use in the embodiment of FIGS. 4, 5, and 10.

The other functional Tasks 1 through 4 include Task 1 at step 218, "Communications," which is responsible for providing input and output of packet data signals over the Zig-Bee® radio interface, via transceiver 106 (See FIG. 11). Task 2 at step 220, "GPS Processing," (FIG. 12) controls the GPS interface to determine the location of the latch monitor 34 and writes data to the event logger 208 as requested and at predetermined intervals. Two types of location reports are logged, immediate location and refined location. Immediate location data from an initial reading is taken without regard for precise accuracy. Refined location data is provided after several readings based on known GPS parameters to allow iteration toward a reading of less uncertainty.

Task 3 at step 222, "Sensor Monitor," (FIG. 13) monitors and logs the output signals S1-S4 of the HES sensors 91-94 respectively. As one of the power saving features of the latch monitor 34, the HES sensors 91-94, may be turned ON and OFF (See, e.g., FIG. 13) and/or powered by I/O pins of the CPU 100. Task 3 may also monitor and log the "At Rest" sensor 116 (alternatively, motion sensor 116). The "At Rest" sensor 116 is read by an interrupt service routine, and a timer may be reset every time motion is detected. The sensor monitor task 3 would then check the timer and track the present state of the container 22. The data from the motion sensor 116 may be used by other tasks to control their respective operation. For example, the GPS Task 2 may be inhibited from taking readings as long as the latch monitor 34 (and container 22) are stopped, i.e., not in motion, to reduce power drain on the battery. However, readings of the location may still be taken at long intervals, e.g., hourly, to provide a sufficient record. In another example, the sensor monitor Task 3 may use the data from the motion sensor 116 to reduce the sensitivity of the HES sensors 91-94 if needed such as when the container 22 is in motion during transport and there is less need for detecting small displacements of the latch mechanism 32. The data from the sensors 91-94 and the "At Rest" sensor 116 is written to the event logger 208. Examples of events that may be logged during Task 3 include "Motion Started," "Motion Stopped," "Door Open," and "Door Closed." Other events may include "Normal Vibration" and abnormal indicators for erratic signals along the x, y, or z axes that may indicate tampering attempts.

Task 4 at step 224, "Power Management," (FIG. 15) controls and monitors the usage of power by the latch monitor circuits 128, including writing data to the event logger 208 about the battery power level and the main supply voltage to the circuits, Vcc, in the event of a change in either parameter.

Task 4 may also generate an hourly "power status" report keyed by the real time clock 112, for the purpose of tracking battery life.

Task 5 at step 206, "Calibration," (FIG. 17) performs calibration of the array of sensors 90 in the latch monitor 34. As described herein above, it is the first task performed following the POST and initialization of the latch monitor circuits 128.

FIG. 11 illustrates a flow chart diagram of a communications Task 1 process for use in the embodiment of FIGS. 4, 5, and 10. The process starts at step 230 to initialize the transceiver 106 in the latch monitor circuit 128. In this function, initialization in step 230 resets ring buffers for incoming commands and data, purges a receive queue, then sleeps for a preset time (five seconds in this example) to allow other processes to be completed. Step 230 is followed by step 232 to wake up the uART and modem on process check in. If this step is successful, as tested in step 234, the flow proceeds to step 236 to determine whether there are data logs to send? If YES, the process advances to step 238 to send the log file and clear the log flags upon a successful transmission. Step 238 is then followed by a step 240 to request a disconnect. Returning to step 234, if the test was not successful, the flow advances directly to the step 240 to request a disconnect. Similarly, in step 236 if there are no data logs to send, then the process steps directly to the step 240 to request a disconnect. In step 242 a test is made to determine if the request to disconnect was granted and if the response is NO, the flow proceeds to step 248 to process additional commands queued up from the host (Task 0, the "Task Master"), then returns to the input of the step 240 to re-enter the process at the step 240, the request to disconnect. If the disconnect request was granted, however, the process advances to step 244 to turn off the uART and the modem, and then go to sleep in step 246 until the next "cheek in time." The check in time may be controlled by a programmable timer within step 246, followed by a return to step 232 to wake up the uART and modem once again.

In the flowchart of FIG. 11, the step 248 to "Process additional commands from host" may include a number of functional operations such as receiving and storing a manifest or update thereto, or accessing and transmitting the stored manifest, uploading alert data or other logged data, re-determining the location data, performing a new calibration (Task 5) or processing other Tasks, etc. One of the novel features of the latch monitor 34 of the present invention is its ability to store manifests in memory 104 within the CPU 100. Thus every container having a latch monitor 34 in the system can have the contents of the container 22 stored at the container, readily available for access simply on sending a command to the latch monitor 34. The data may be returned via the transceiver 106 by merely initiating an "update manifest" routine in the latch monitor circuit 128. As described herein above, such update routines are well-known in the art and will not be further described herein. One advantage of having the manifest stored at the container is that, in the event of an incident involving unauthorized movement or tampering with the container or its involvement in an accident, the contents can be completely and accurately known on site and in real time to promptly enable the most appropriate response to the incident.

Figure 12:
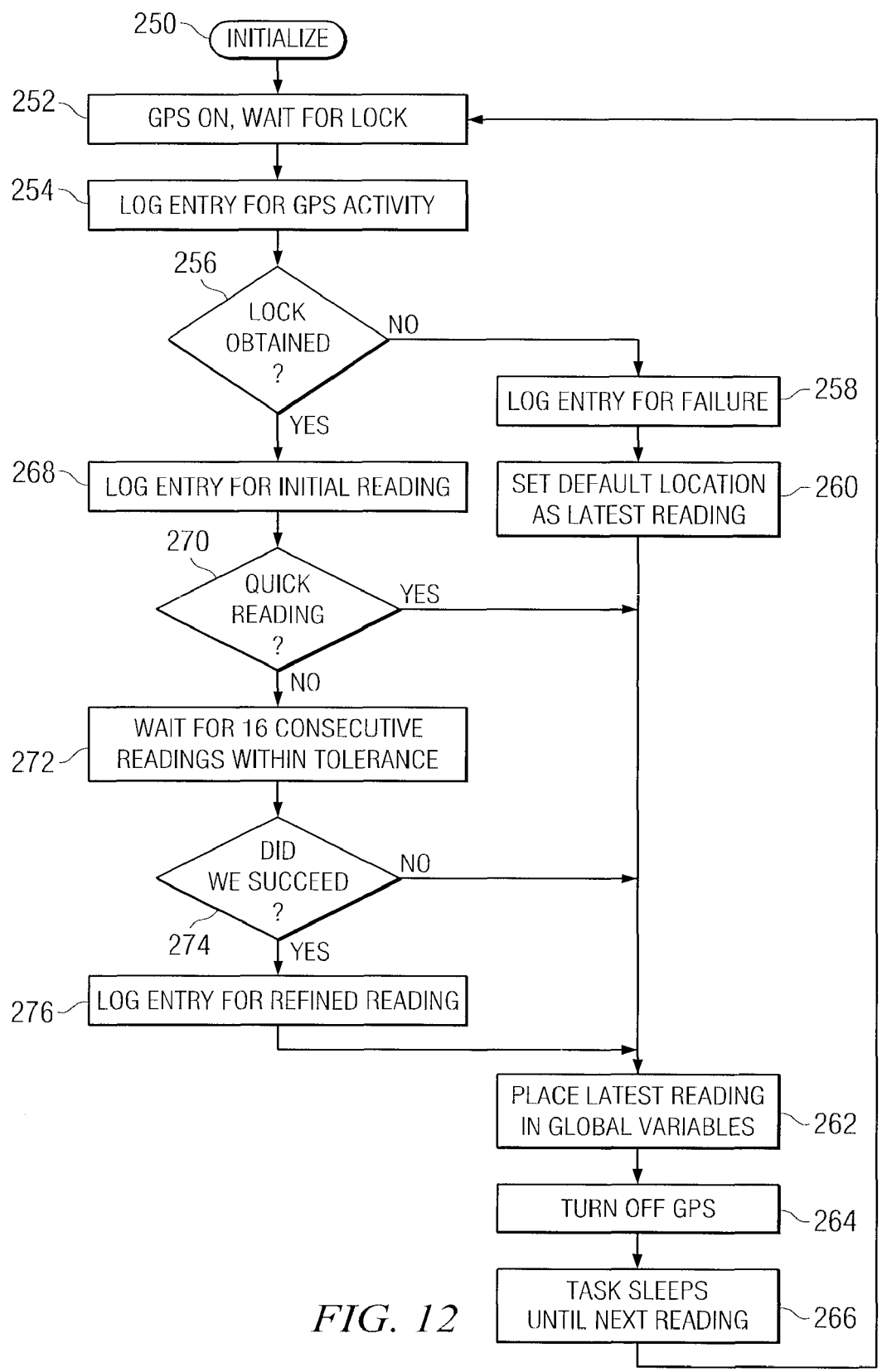
FIG. 12 illustrates a flow chart diagram of a GPS Task 2 process for use in the embodiment of FIGS. 4, 5, and 10.

Referring to FIG. 12 there is illustrated a flow chart diagram of a GPS Task 2 process for use in the embodiment of FIGS. 4, 5, and 10. The process begins with an initialization step 250, to set up default positions to report in the absence of readings, then turn on a pull up resistor to activate power control for the GPS circuit. The circuit then sleeps for a preset time interval (ten seconds in this example) to allow the completion of other processes, followed by defining the first GPS reading as an attempt to obtain a refined GPS reading.

Step 250 is followed by activating the GPS receiver 114 and waiting for a lock indication in step 252. Upon receiving the lock indication, a log entry for GPS activity is made in step 254 before advancing to step 256 to verify whether lock was obtained. If NO, the flow proceeds to step 258 to log an entry for failure to lock, followed by setting a default location as the latest reading in step 260 and placing that reading in a global variables register in step 262. Then the flow advances to step 264 to turn OFF the GPS receiver 114 and end the task—i.e., the task enters sleep mode in step 266 until the next reading, returning to step 252 to await a lock indication.

Returning to step 256, if a lock indication was obtained, the process flows to step 268 to log the entry for the initial reading and then test the reading in step 270 to verify whether the location reading was a so-called "quick reading," that is, a lock obtained upon a first successful reading of the data necessary to establish a signal lock condition, indicating that the location estimation to refine the reading may begin. As is well known, the GPS receiver measures the time a navigation message is received from each of several satellites and solves for the rectangular coordinates and the time of its own location and estimates the distance between the satellite and the GPS receiver. Generally, information from four satellites enable the GPS receiver to determine a first approximation of its location. Refinement of the location may be determined through iteration.

Continuing with FIG. 12, if the result of the query in step 270 is YES, the process flows to step 262 to place the latest reading in a global variables register, followed by turning OFF the GPS receiver 114 in step 264 and ending the task—i.e., the task enters sleep mode in step 266 until the next reading, returning to step 252 to await a lock indication. Returning to step 270, if the result of the test is NO, the flow advances to step 272 in which the GPS receiver 114 waits for 16 consecutive readings that are within a predetermined tolerance, then performs a test step 274 to determine if the required number of in-tolerance readings was received. If NO, the task branches again to steps 262 to 266 to store the latest reading in global variables, turn off the GPS receiver, and go to sleep until the next reading. If, however, 16 intolerance readings were received the flow advances from step 274 to step 276 to log the entry for a refined reading before proceeding to step 262 to store the reading, etc. as explained herein above. It will be appreciated by persons skilled in the art that logging GPS location data along with time and event data such as the status of the container door, the status of the container itself—for example, whether it is in storage or transit, at rest or in motion, whether it is involved in a breach attempt, etc.—can be invaluable in responding to incidents that place the container and its contents at risk of loss or damage.

Figure 13:
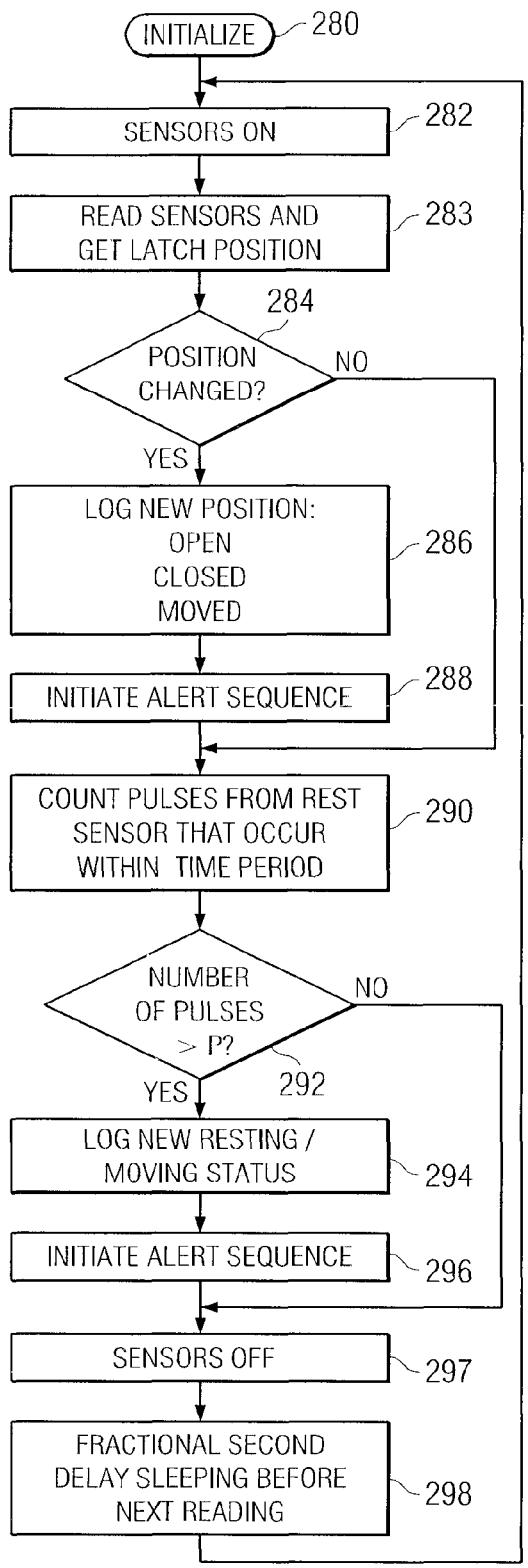
FIG. 13 illustrates a flow chart diagram of a sensor Task 3 process for use in the embodiment of FIGS. 4 through 10.

Referring to FIG. 13 there is illustrated a simplified flow chart diagram of a sensor Task 3 process for use in the embodiment of FIGS. 4 through 10. The flow begins with step 280 to perform the following functions: initialize a "DoorState" holder, define a starting sensor for scanning the array of sensors 90, setting an initial zone to zero (0) (i.e., for an open door), and initialize the variables for the minimum and maximum sensor readings. Following initialization of the processor 100 in step 280, the sensors of the sensor array 90 and the motion (At Rest) sensor 116 are turned ON or enabled in step 282 and read in step 283 to obtain data for the position of the magnet 88 in the rotating rod 36 and to detect motion of the shipping container 22. In step 284, if YES, the position of the magnet 88 has changed, the flow advances to step 286 to log the new position of the magnet 88 and determine whether the container door 52 is open, closed, or has been moved. In step 288, if the condition of the container door 52 is not authorized, i.e., it does not correlate with an actual opening or closing of the container door, the logged event data is interpreted and an alert sequence is initiated and the flow advances to step 290.

Continuing with FIG. 13, in step 290 the process turns its attention to a background task that began if the motion sensor 116 outputted a pulse after the sensors were enabled in step 282. Such an output pulse occurs when any motion of the container is detected. The process in step 290 begins to count the number of output pulses of the motion sensor 116 that occur within a user-setable period of time, e.g., "$\Delta T$" seconds. In the illustrative embodiment, setting $\Delta T=60$ seconds has been shown to be a suitable length. In the following step 292, the number of pulses is compared with a limit value "P," which may be set by the user to some value, say ten (10) pulses. Thus, if the number of pulses counted within $\Delta T$ exceeds the limit value P, the process advances from step 292 to step 294 to log the new resting/moving status. Thereafter, an alert sequence may be initiated in step 296 and the flow proceeds to step 297. In step 297, the sensors are turned OFF or disabled. In the following step 298 a sleep timer begins a brief sleep interval before the process returns to step 280 to read the sensor array 90 and the motion sensor 116 of FIG. 5. Returning to step 292, if the number of output pulses from the motion sensor 116 does not exceed the limit value P within the time $\Delta T$, the flow follows the "N" path directly to step 297, where the process ends and is re-initiated at step 280 following a brief sleep cycle. It will be noted by persons skilled in the art that steps 282 and 297, respectively sensors ON and sensors OFF, are separately performed to enable control of the power consumption in the latch monitor 34. In some embodiments these steps may be deleted if for example, conservation of power is not critical.

It will be recalled from the detailed description about FIGS. 4 through 9 that the array of sensors 90 in the latch monitor 34 is configured to determine the position of the magnet 88 that is installed in the rotating rod 36, using the measured data about the magnet position to interpret this data and determine the condition of the latch mechanism 32 of the container 22. The purpose of the latch monitor 34 is to detect a breach of the container and the conditions of the container at the time of the incident, store the data, and communicate the data (as in an alert sequence or other message) on command from a base station or a container yard server or other authorized terminal (See FIGS. 1 and 2). The arrangement of the sensors 91-94 enables the latch monitor circuits 128 to track the status of the latch mechanism 32 and interpret on a continuing basis what the measurements of the magnet position mean as to the kind of event experienced by the container door 52. The processing undertaken in the latch monitor 34 to accomplish these functions takes place primarily during the steps 284 (magnet position changed?) and step 292 (Number of pulses exceed P?, corresponding to the query "has the rest/motion state changed?"). These functions are accomplished through the execution of the routines described. There is sufficient information presented in the description of FIGS. 5 through 9 and in the flow chart diagrams presented herein to enable persons skilled in the art to construct a suitable data acquisition, analysis, and interpretive program to perform these functions.

Figure 14:
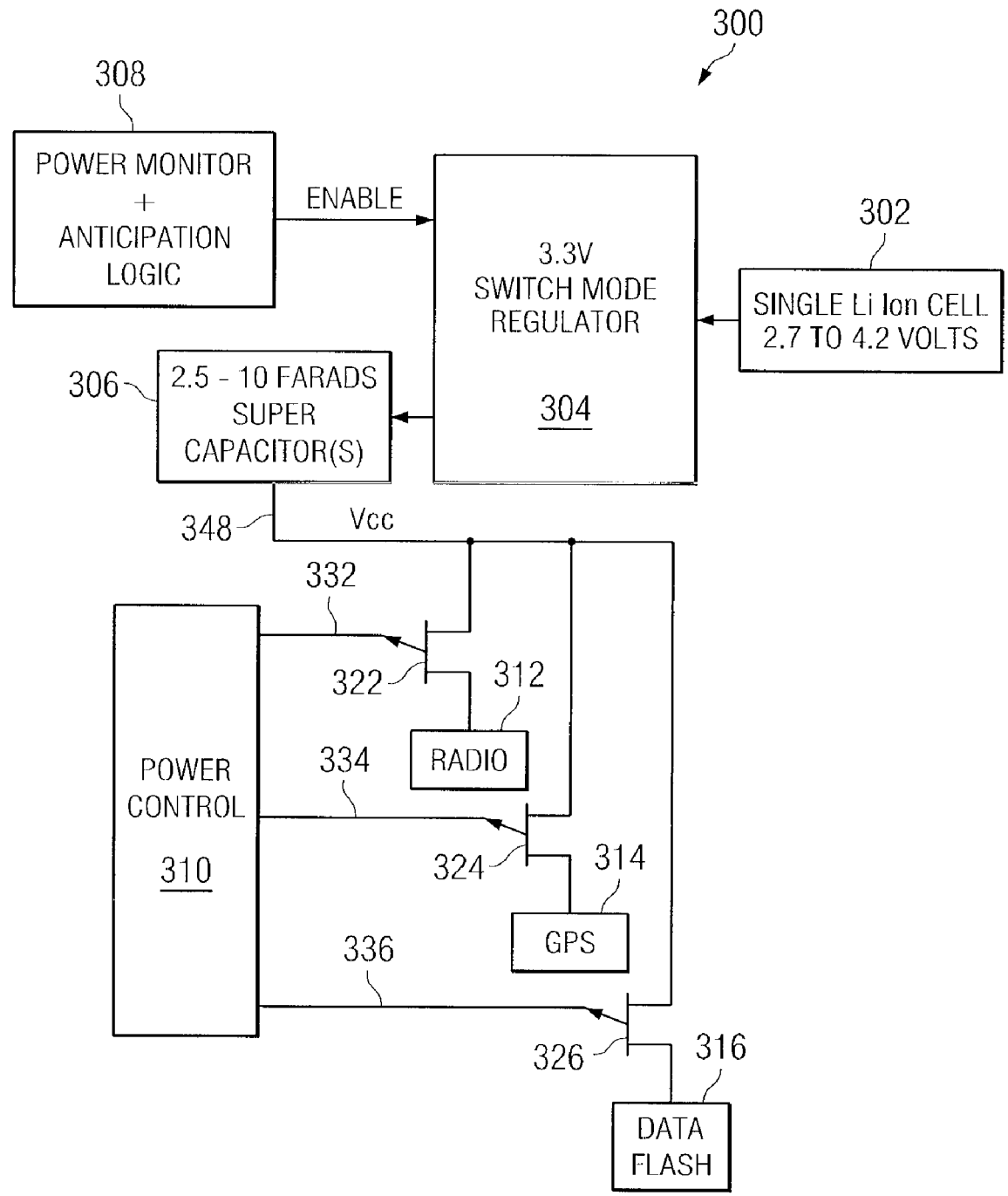
FIG. 14 illustrates a block diagram of a power system for use in the embodiment of FIGS. 4, 5, and 10.

Referring to FIG. 14 there is illustrated a block diagram of a power system for use in the embodiment of FIGS. 4, 5, and 10. It will be noted that, for reasons of clarity, the return path for current in each functional block of the system, though not shown in the figure, is assumed to be present. The power system 300 derives operating current from a battery 302 that delivers nominally 3.6 Volts to the input of a high efficiency power supply 304. The battery 302 may preferably be a single Lithium Ion (Li I) cell. Power supply 304 may preferably be a switchmode regulator that operates at very low currents as it provides a regulated 3.3 Volts at its output. The operation of the power supply 304 itself may be enabled by a control signal from the power monitor function 308. A capacitor 306 (a "supercap") of 2.5 to 10.0 Farads is connected across the output of the power supply 304. Thus, the capacitor 306 supplies operating current to the circuit loads of the latch monitor circuit 128 during the brief time each is operational, while the power supply 304 maintains a sufficient charge on the capacitor 306. The loads connected to a terminal of the capacitor 306 of the power supply 304 are each separately controlled through a series FET switch to supply power on demand as determined by a power control function 310. The power monitor 308 (including anticipation logic) and power control 310 may be implemented as firmware functions resident in the CPU 100.

The power monitor 308 operates to log various present voltage levels (as in step 360) at user-settable timed intervals as follows. The voltage levels may each be defined as a "battery state N," where N=0 through 7, for example. Thus, an alert leading to an alarm may be initiated by certain ones of the "Batt States" during the step 356 process power states in sequence. For any power state (or "Batt State") that has changed, it becomes e.g., a "New State," and an alert may be issued for processing by the CPU 100. In the illustrated embodiment, the "Batt States" may be defined as follows:

Batt State 1 indicates that a first user set alarm level has been reached;
Batt State 2 indicates that a second user set alarm level has been reached;
Batt State 3 indicates when the battery voltage is below critical (Vbatt<3000 mVolts);
Batt State 4 indicates when the Vcc voltage is below critical (Vcc<2900 mVolts); and
Batt State 7 indicates when Vbatt<2000 mVolts.
Batt State 0 may indicate some functional statement, e.g., "Here are the voltage readings . . ." Batt states 5 and 6 may be reserved. Further, the power states, as in this example, may be recorded and/or reported each hour per step 364.

Continuing with FIG. 14, the radio 312 (task 1), connected to the Vcc bus 348 at the output terminal of the capacitor 306 through a FET 322, receives control signals from the power control circuit 310 on gate lead 332. Similarly, GPS 314 (task 2) is controlled by FET 324 on gate lead 334, data flash 316 is controlled by FET 326 on gate lead 336, pressure sensor 318 is controlled by FET 328, calibration 320 (task 5) by FET 330, and sensors 342 (task 3) by FET 342. In operation, each FET switch is controlled according to which particular circuit is needed to be active at each step in each task. The logic includes recognition when one circuit in use requires another circuit's function to be completed before disconnection. An example is keeping the communication task circuit (transceiver 106) in the latch monitor circuit 128 operating until the requirement for data from the data flash function is completed. Each of the tasks in the control system is responsible for turning OFF its connection to the power supply when it is not in use. This use of one power supply for a plurality of individually switchable loads controlled by the on-demand needs of the individual branches of the circuit enables the battery 302 to operate for months without replacement or recharging.

Figure 15:
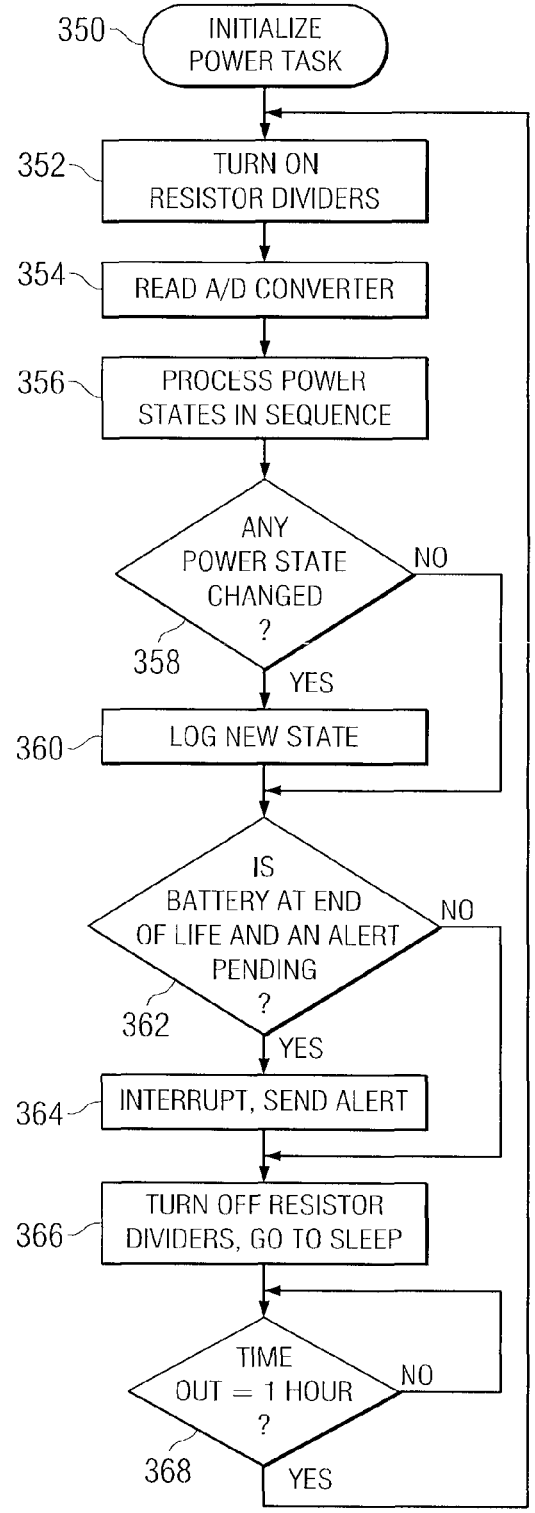
FIG. 15 illustrates a flow chart diagram of a power management Task 4 process for use in the embodiment of FIGS. 4, 5, 10, and 14.

Referring to FIG. 15 there is illustrated a flow chart diagram of a power monitor Task 4 process for use in the embodiment of FIGS. 4, 5, 10, and 14. The purpose of the power task is to track the status of the battery voltage and the value of the Vcc voltage that supplies the circuits in the latch monitor circuit 128, and log the power state at regular intervals to track battery life. The power monitor Task 4 begins with a step 350 to initialize the power monitor task followed by turning on the resistor dividers in the A/D converter section 102 of the CPU 100 in step 352. Step 354 follows, wherein the analog value of the supply voltage Vcc bus 348 (See FIG. 14) is read and digitized in the A/D converter 102, converting the analog voltage into digital numbers or count values, and logging the event.

Continuing with FIG. 15, step 356 retrieves the measured count value to process the power state indicated by the count value for Vcc. The power state is tested against the previous value in step 358 and the new state logged in step 360 if the state has changed. If the power state has not changed, the log new status step is skipped and the flow advances to step 366 to turn OFF the resistor dividers in the A/D converter 102 and "go to sleep" until the time for the next reading to be made. From step 366, the process pauses at a timer in step 368 before advancing to the beginning of the power management task into step 352 as described herein above. The time value in the exemplary embodiment is shown as one hour, but may be set to another value consistent with the application. In a typical case, the CPU 100, when monitoring the event log and checking its contents against the corresponding stored reference values, will generate an alert when a value is out of tolerance and forward the indiction to process an alert sequence. As described herein above, an alert sequence may culminate in a signal to the LEDs or to the communications task for transmission to the base station or to the yard server, for example.

Figure 16:
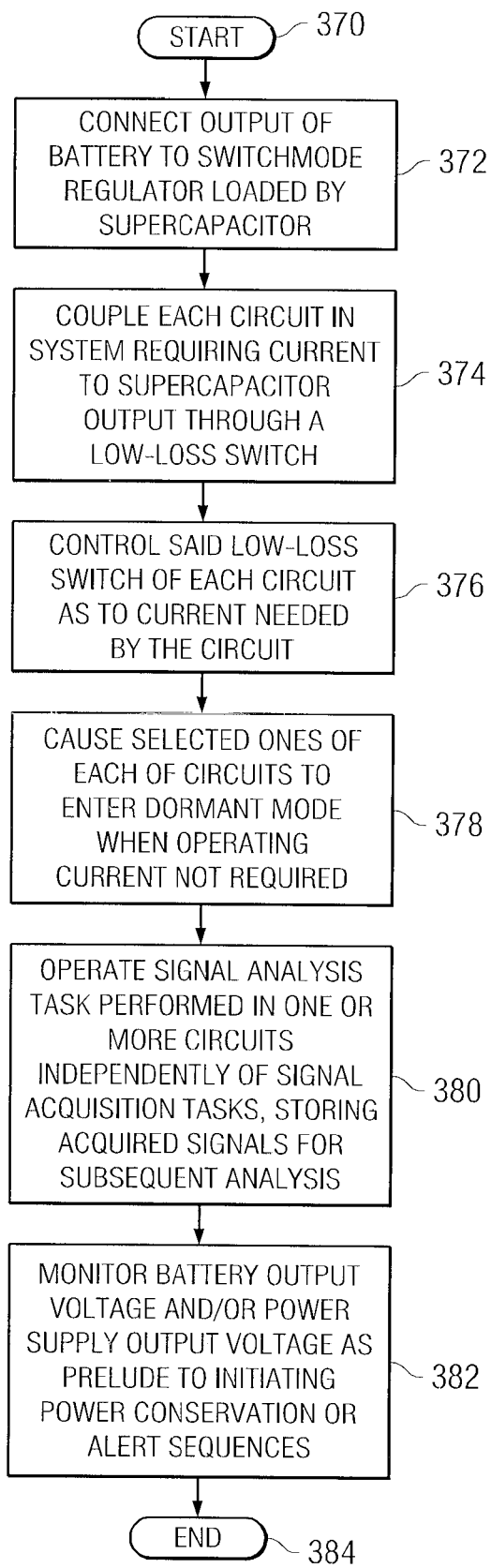
FIG. 16 illustrates a flow chart summarizing a process for maximizing battery life in the embodiment of FIGS. 4, 5, and 10.

Referring to FIG. 16 there is illustrated a flow chart that summarizes a process or method for maximizing battery life in the exemplary latch monitor 34 of the present invention. Each of the steps in this process are embodied in the latch monitor 34 as described in detail for several of the figures herein. For example, refer to FIGS. 4, 5, and 10 through 15. Considered together, the combination of steps shown in FIG. 16 results in considerable savings of power and an extended battery life. This is an important consideration for a device such as the latch monitor 34 described herein and attached to a shipping container that may be in transit or storage for considerable periods of time.

Continuing with FIG. 16, the flow begins at a start step 370 followed by step 372 to connect the output of the battery 302 to a switchmode, low current regulator 304 loaded by a supercapacitor 306. Next, in step 374 couple each circuit in the system—here the illustrative latch monitor 34—that requires current to the output of the supercapacitor 306 via a low-loss switch such as FET switches 322, 324, and 326. Thereafter the flows proceeds to step 376 to control the respective low-loss switch (it does not have to be a FET switch; it could be implemented by other types of semiconductors) at each circuit according to the need for current by that circuit. The foregoing steps are illustrated in FIG. 14. The flow then advances to step 378 to cause selected ones of each of the circuits drawing power to enter a dormant mode when operating current is not required. As an example, refer to a step in each of FIGS. 11-14 that include a "sleep" step near the end of a routine. Step 378 is followed by step 380 to operate signal analysis tasks performed in one or more circuits independently or signal acquisition tasks, storing the acquired signals for subsequent analysis. One example (see FIG. 5) of this step 380 occurs in the CPU 100, which stores signal data output from the A/D 102 in memory 104 for later analysis as a background task. Performing the analysis during the signal acquisition uses considerably more power when the CPU 100 is active, than separate operation of these tasks. In a following step, 382, the system may monitor battery output voltage and/or power supply output voltage as a prelude to initiating power conservation or alert sequences, as described for FIG. 15. The methods for maximizing battery life concludes, in this example, with an exit step 384.

Referring to FIG. 17 there is illustrated a flow chart diagram of a calibration Task 5 for calibrating the magnetic disturbance sensor of the embodiment of FIGS. 4 through 10. This auto calibration routine begins at step 390, followed by step 392 to trigger the LEDs 120-126 in the status indicator 118 to blink in sequence from right-to-left (in this example). This right-to-left sequence is a signal to an installer or technician to open the container door 52. Opening the container door 52 moves the magnet 88 away from the sensors 91-94 so that their outputs will be below the threshold value that is initially set at the median level=512 counts. Next, in step 394 the CPU 100 causes the A/D converter 102 to read and measure the sensor output values, average them over a predetermined number of measurement cycles (120 times in this example), and store the resulting maximum and minimum count values for the condition of a fully open door.

Continuing with FIG. 17, the flow begins at a start step 370 followed by step 372 to connect the output of the battery 302 to a switchmode, low current regulator 304 loaded by a supercapacitor 306. Next, in step 374 couple each circuit in the system—here the illustrative latch monitor 34—that requires current to the output of the supercapacitor 306 via a low-loss switch such as FET switches 322, 324, and 326. Thereafter the flows proceeds to step 376 to control the respective low-loss switch (it does not have to be a FET switch; it could be implemented by other types of semiconductors) at each circuit according to the need for current by that circuit. The foregoing steps are illustrated in FIG. 14. The flow then advances to step 378 to cause selected ones of each of the circuits drawing power to enter a dormant mode when operating current is not required. As an example, refer to a step in each of FIGS. 11-14 that include a "sleep" step near the end of a routine. Step 378 is followed by step 380 to operate signal analysis tasks performed in one or more circuits independently of signal acquisition tasks, storing the acquired signals for subsequent analysis. One example (see FIG. 5) of this step 380 occurs in the CPU 100, which stores signal data output from the A/D 102 in memory 104 for later analysis as a background task. Performing the analysis during the signal acquisition uses considerably more power when the CPU 100 is active, than separate operation of these tasks. In a following step, 382, the system may monitor battery output voltage and/or power supply output voltage as a prelude to initiating power conservation or alert sequences, as described for FIG. 15. The methods for maximizing battery life concludes, in this example, with an exit step 384.

The upper and lower limits of the threshold window are determined in steps 404 and 406 respectively. In step 404, the difference value is multiplied by two and added to the maximum count value stored in step 398 for a closed and latched container door 52. In step 406, the difference value is multiplied by two and subtracted from the minimum count value for a closed and latched container door 52. Thus, the threshold window is approximately five times the difference value (i.e., the noise width) and is centered approximately on a median or intermediate count value of the input range of the A/D converter 102. The value of the multiplier (five in this example) may be user programmable. The upper and lower threshold values provide a reference against which sensor outputs corresponding to movements of the magnet 88 away from a closed and latched position can be detected and evaluated.

Once these limits are established, the auto calibration sequence ends at step 408 and the routine exits.

The foregoing detailed description is based on the use of a magnetic disturbance detector, comprising a magnet, an array of magnetic sensors and associated processing circuits, for detecting movement or a movable component of a door latch assembly relative to a fixed or stationary component of the door latch assembly mounted on the container or other article having a need for a mechanical latch. The magnet may be a permanent magnet as described herein or an electromagnet. A magnetic disturbance detector is one example of a disturbance detector that operates using an electromagnetic flux field, as described in detail herein above. Another example that is usable for the same purpose and thus represents an alternative embodiment contemplated herein is the use of light energy as the medium for signaling the relative positions of the components of the latch assembly. For example, a light emitting device such as a light emitting diode or other light source may be used in place of the magnet such that the beam of light from the light emitting device provides the "flux." Then, an array of light sensitive elements such as photo diodes, photo cells, photo transistors, charge-coupled devices, image sensors, or the like could be used to detect the beam of light or flux from the light emitting device. The light sensing elements occupy the same positions as in the magnetic disturbance detector, and the circuitry and remaining components of the latch monitor 34 are essentially the same, with adjustments in design being made to accommodate the interface with the light devices. In such an embodiment, the wavelengths of the light energy need not be limited to the visible spectrum. Similar disturbance detectors operating on electromagnetic flux, using emitters and sensors not yet commonly available, could of course be used.

In another embodiment, the number of sensors used in the array of sensors 90 (see FIGS. 4, and 6 through 9) may be varied. While four such analog Hall Effect sensors (HES) are used in the illustrated embodiment, it is also possible to provide a system for detecting the condition of the door latch using only two sensors, placed in the positions of the sensors S2 and S3 as shown in the FIGS. 4, 6, 7, 8 and 9. Such an array provides somewhat less information about the position of the movable portion of the latch assembly but is nevertheless able to differentiate a closed and latched door from one in which the door latch is not fully latched or is open, either partially or fully. Moreover, a two-sensor array, using the same processing circuitry adjusted for operation with two sensors instead of four, is still able to detect other conditions indicating tampering or incidental events. Alternatively, instead of analog HES devices, digital HES devices may be used to measure the timing between the activation of the sensors corresponding to the movement of the rotating rod. Further, with either type of sensor, the output of the motion sensor may be combined with the magnetic sensor data to more accurately determine the behavior of the system. For example, if it is sensed that the container is moving, and disturbances in the magnetic field are also detected, it could mean that the container is being moved while still on a trailer.

Persons skilled in the art will also recognize that the door latch disturbance detector of the present invention may be used with a latch rod that moves longitudinally—i.e., slides along its longitudinal axis—as well as rotating about its longitudinal axis. In both embodiments, the detection system is responsive to the translation of the flux emitting element within a plane of motion. The flux emitting element either rotates in a plane back and forth past the array of sensors disposed in the same plane, or the flux emitting element moves linearly back and forth (or, up and down) past the array of sensors in the same plane. It is simply a matter of arranging the sensors in the array in the required orientation. For example, referring to FIG. 4, 6, or 8, simply rotating the array of sensors 90 by 90° positions the array of sensors 90 to detect disturbances to a latch rod 36 that moves along its longitudinal axis to latch or unlatch it.

While the invention has been described and illustrated in only one of its forms, and even several alternative embodiments, it is not thus limited but is susceptible to various changes and modifications without departing from the spirit thereof.

What is claimed is:

1. A method for maintaining a manifest for a shipping container, comprising the steps of:
    in a processor remote from said shipping container, reducing said manifest to digital form and storing it in a non-transitory memory in said processor;
    attaching a latch monitor to the outside of said shipping container;
    coupling said latch monitor to a latching mechanism of said shipping container;
    establishing a radio communication link from said processor remote from said shipping container to a transceiver in said latch monitor attached to said shipping container;
    transmitting said manifest from said remote processor to said transceiver in said latch monitor for storage in a non-transitory memory segment therein; and
    providing for transmitting said manifest from said latch monitor upon receipt of a command transmitted from a remote processor to said latch monitor.

2. The method of claim 1, further comprising, after the step of reducing, the step of:
    including in said latch monitor an electrical circuitry having a processor, a non-volatile memory, and a transceiver coupled to an antenna.

3. The method of claim 2, wherein said including step further comprises the step of:
    coupling said latch monitor to a latching mechanism of said shipping container via a wireless latch disturbance sensor.

4. The method of claim 3, wherein said coupling step comprises:
    attaching a magnet to a movable component of said latch mechanism; and
    attaching a magnetic sensor to a stationary component of said latch mechanism.

5. The method of claim 2, further comprising the step of:
    coupling said latch monitor including said electrical circuitry and a wireless latch disturbance sensor to a latch mechanism of said shipping container.

6. The method of claim 5, wherein said coupling step further comprises the step of:
    configuring said wireless disturbance sensor as a magnetic field sensor.

7. The method of claim 6, wherein said configuring step comprises the steps of:
    attaching a magnet to a movable component of said latch mechanism; and
    attaching a magnetic sensor to a stationary component of said latch mechanism.

8. A method for maximizing battery life in a latch monitor for a shipping container latch mechanism, comprising the steps of:
    connecting the output of said battery to a switchmode, low current regulator loaded by a supercapacitor;

coupling each loading circuit in said latch monitor requiring current to the output of said supercapacitor through a low-loss switch;

controlling said low-loss switch of each said circuit according to the need for operating current by said circuit; and operating signal analysis tasks performed in one or more of said circuits independently of signal reception tasks, after storing received signals for subsequent analysis.

9. The method of claim 8, further comprising the step of:
causing selected ones of each of said circuits to enter a dormant mode when it does not require said operating current.

10. The method of claim 8, further comprising the step of:
monitoring battery output voltage as a prelude to initiating power conservation processes.

* * * * *